United States Patent
Ikarashi

(10) Patent No.: US 11,907,641 B2
(45) Date of Patent: Feb. 20, 2024

(54) PARAMETER SETTING APPARATUS, COMPUTATION APPARATUS, METHOD, PROGRAM, AND RECODING MEDIUM THEREOF

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 673 days.

(21) Appl. No.: 16/981,064

(22) PCT Filed: Mar. 11, 2019

(86) PCT No.: PCT/JP2019/009597
§ 371 (c)(1),
(2) Date: Sep. 15, 2020

(87) PCT Pub. No.: WO2019/181594
PCT Pub. Date: Sep. 26, 2019

(65) Prior Publication Data
US 2021/0027009 A1    Jan. 28, 2021

(30) Foreign Application Priority Data
Mar. 19, 2018    (JP) .................. 2018-051009

(51) Int. Cl.
*G06F 17/00* (2019.01)
*G06F 40/126* (2020.01)
(Continued)

(52) U.S. Cl.
CPC .......... *G06F 40/126* (2020.01); *G06F 40/131* (2020.01); *G06F 40/44* (2020.01)

(58) Field of Classification Search
CPC ........ G06F 40/10; G06F 40/44; G06F 40/126; G06F 40/12; G06F 40/131; G06F 40/205;
(Continued)

(56) References Cited

U.S. PATENT DOCUMENTS

2006/0177061 A1*  8/2006  Orsini ................. H04L 9/085
                                                   380/247
2014/0101538 A1*  4/2014  Style ................. G06F 40/143
                                                   715/234
(Continued)

OTHER PUBLICATIONS

Tobias Mühlbauer, et al., "Instant Loading for Main Memory Databases" Proceedings of the VLDB Endowment, vol. 6, No. 14, XP58036636, Sep. 1, 2013, pp. 1702-1713.
(Continued)

*Primary Examiner* — Michael Ortiz-Sanchez
(74) *Attorney, Agent, or Firm* — Oblon, McClelland, Maier & Neustadt, L.L.P.

(57) ABSTRACT

A calculation process is efficiently performed to a text file in which one or more records are included, each of the records includes one or more cells having an arbitrary length, and each of the cells includes arbitrary pieces of characters. A parameter setting apparatus sets a maximum value $S_{csv}$ and a minimum value $s_{csv}$ of a size of character strings for one record by using attribute information as an input, a maximum value $S_{enc}$ of a total size of encode information, a maximum value $S_{ss}$ of a total size of a calculation value obtained by performing specific calculation to the encode information, and a total size $S_{ref}$ of reference information, obtains a function value of $C/(S_{csv}+S_{enc}+S_{ref})$ as the number of records which is a process unit of encoding and calculation, and obtains a function value of $f_0/I \cdot S_{csv}$ as the number of parallels in the calculation process. Here, C is a cache memory size, M is a main memory size, and $f_0$ is a function value of $s_{csv} \cdot M/(s_{csv}+S_{enc}+\max(S_{ref},S_{ss}))$.

10 Claims, 18 Drawing Sheets

(51) Int. Cl.
*G06F 40/131* (2020.01)
*G06F 40/44* (2020.01)

(58) Field of Classification Search
CPC .... G06F 40/216; G06F 40/123; G06F 40/183; G06F 40/166; G06F 40/19
See application file for complete search history.

(56) References Cited

U.S. PATENT DOCUMENTS

2016/0239237 A1* 8/2016 Gong .................... G06F 3/0683
2020/0293164 A1* 9/2020 Lee ......................... G06F 40/14

OTHER PUBLICATIONS

International Search Report dated May 21, 2019 in PCT/JP2019/009597 filed on Mar. 11, 2019.
Shafranovich, "Common Format and MIME Type for Comma-Separated Values (CSV) Files", SolidMatrix Technologies, Inc., 2005, [searched on Jan. 6, 2018], Internet URL:<http://www.ietf.org/rfc/rfc4180.txt>, pp. 1-8.
Ikarashi et al., "Secure Database Operations Using an Improved 3-party Verifiable Secure Function Evaluation", In SCIS 2011, The 2011 Symposium on Cryptography and Information Security, The Institute of Electronics, Inc., Information and Communication Engineers, 2011, pp. 1-8 (20 total pages) (with unedited computer-generated English translation).
Shamir, "How to Share a Secret", Programming Techniques, Communications of the ACM, 1979, vol. 22, No. 11, pp. 612-613.

* cited by examiner

"Ishida","Taro","1990/2/8","100-0002","sjeifdfgjrrf","45dkfjkejdf5"

"Ishida","Jiro","1985/5/2","111-0112","25df4d4ed","1s4dlccclseed"

"Ishida","Hanako","2001/4/8","111-2222","5d4e4d4ffg","skekdjjfaae"

"Sato","Taro","1992/7/11","111-0345","dlekd4f3e","4selddks""k304kdkk400-03d"

"Sato","Jiro","1989/8/21","123-0434","dkesopd445e","4ssjdejdoseae3230dds"

"Sato","Hanako","1995/2/3","145-0234","skdeofl4s3d3","skek94kdskd4dc"

"Tanaka","Taro","1992/3/23","134-0134","dj394949495kf","47s52¥n5412485d"

"Tanaka","Jiro","1979/4/21","111-0123","2223do¥¥ndof4ofed","ddjjfdl445ff44ff"

"Tanaka","Hanako","1999/8/11","199-0222","dekdiedisdc","2203ddd333333333"

...

"Yamada","Taro","1990/11/15","100-0002","eik39dkk4fg","aa112334455666"

FIG. 9

|  | att(1) | att(2) | att(3) | att(4) | att(5) | att(6) |
|---|---|---|---|---|---|---|
| rec(1) | "Ishida" | "Taro" | "1990/2/8" | "100-0002" | "sjeifdfgjrrf" | "45dkfjkejdf5" |
| rec(2) | "Ishida" | "Jiro" | "1985/5/2" | "111-0112" | "25df4d4ed" | "1s4dlccclseed" — cell(2, 6) |
| rec(3) | "Ishida" | "Hanako" | "2001/4/8" | "111-2222" | "5d4e4d4ffg" | "skekdjfaae" |
| rec(4) | "Sato" | "Taro" | "1992/7/11" | "111-0345" | "dlekd4f3e" | "4selddks" "k304kdkk400-03d" |
| rec(5) | "Sato" | "Jiro" | "1989/8/21" | "123-0434" | "dkesopd445e" | "4ssjdejdoseae3230dds" |
| rec(6) | "Sato" | "Hanako" | "1995/2/3" | "145-0234" | "skdeofl4s3d3" | "skek94kdskd4dc" |
| rec(7) | "Tanaka" | "Taro" | "1992/3/23" | "134-0134" | "dj39494949495kf" | "47s52¥n5412485d" |
| rec(8) | "Tanaka" | "Jiro" | "1979/4/21" | "111-0123" | "2223do¥¥ndof4ofed" | "ddjjfdl445ff44ff" |
| rec(9) | "Tanaka" | "Hanako" | "1999/8/11" | "199-0222" | "dekdiedisdc" | "2203ddd333333333" |
| ... |
| rec(W) | "Yamada" | "Taro" | "1990/11/15" | "100-0002" | "eik39dkk4fg" | "aa112334455666" |

FIG. 10

Ishida,Taro,1990/2/8,100-0002,Tokyo Shibuya-ku OOO,03-3234-5678

Ishida,Jiro,2000/4/2,274-16,Kanagawa Fujisawa-shi Enoshima OOO,03-9999-9999

Ishida,Hanako,1985/6/2,352-725,Tokyo Minato-ku OOO,03-1111-9999

Sato,Taro,2001/5/1,100-0002,Tokyo Chiyoda-ku OOO,03-3234-5678

Sato,Jiro,2001/6/2,274-16,Kanagawa Fujisawa-shi Enoshima OOO,03-9999-9999

Sato,Hanako,2002/7/2,352-725,Tokyo Shinjuku-ku Shinjuku OOO,03-1111-9999

Tanaka,Taro,2001/1/1,100-0002,Tokyo Chiyoda-ku OOO,03-1234-5678

Tanaka,Jiro,2001/1/2,251-0036,Kanagawa Fujisawa-shi Enoshima OOO,0712-9999-9999

Tanaka,Saburo,1962/10/2,123-0000,Tokyo Adachi-ku OOO,03-9988-9999

...

Yamada,Hanako,2002/1/2,111-1136,Tokyo Shinjuku-ku Shinjuku OOO,03-1211-9899

FIG. 15

| | att(1) | att(2) | att(3) | att(4) | att(5) | att(6) |
|---|---|---|---|---|---|---|
| rec(1) | Ishida,Taro,1990/2/8,100-0002,Tokyo Shibuya-ku ○○○,03-3234-5678 |
| rec(2) | Ishida,Jiro,2000/4/2,274-16,Kanagawa Fujisawa-shi Enoshima ○○○,[03-9999-9999] ← cell(2, 6) |
| rec(3) | Ishida,Hanako,1985/6/2,352-725,Tokyo Minato-ku ○○○,03-1111-9999 |
| rec(4) | Sato,Taro,2001/5/1,100-0002,Tokyo Chiyoda-ku ○○○,03-3234-5678 |
| rec(5) | Sato,Jiro,2001/6/2,274-16,Kanagawa Fujisawa-shi Enoshima ○○○,03-9999-9999 |
| rec(6) | Sato,Hanako,2002/7/2,352-725,Tokyo Shinjuku-ku Shinjuku ○○○,03-1111-9999 |
| rec(7) | Tanaka,Taro,2001/1/1,100-0002,Tokyo Chiyoda-ku ○○○,03-1234-5678 |
| rec(8) | Tanaka,Jiro,2001/1/2,251-0036,Kanagawa Fujisawa-shi Enoshima ○○○,0712-9999-9999 |
| rec(9) | Tanaka,Saburo,1962/10/2,123-0000,Tokyo Adachi-ku ○○○,03-9988-9999 |
| ... | |
| rec(W) | Yamada,Hanako,2002/1/2,111-1136,Tokyo Shinjuku-ku Shinjuku ○○○,03-1211-9899 |

FIG. 16

Ishida,Taro,1990/2/8,100-0002,Tokyo Shibuya-ku OOO,03-3234-5678

Ishida,Jiro,2000/4/2,274-16,Kanagawa Fujisawa-shi Enoshima OOO,03-9999-9999

Ishida,Hanako,1985/6/2,352-725,Tokyo Minato-ku OOO,03-1111-9999

Sato,Taro,2001/5/1,100-0002,Tokyo Chiyoda-ku OOO,03-3234-5678

Sato,Jiro,2001/6/2,274-16,Kanagawa Fujisawa-shi Enoshima OOO,03-9999-9999

Sato,Hanako,2002/7/2,352-725,Tokyo Shinjuku-ku Shinjuku OOO,03-1111-9999

Tanaka,Taro,2001/1/1,100-0002,Tokyo Chiyoda-ku OOO,03-1234-5678

Tanaka,Jiro,2001/1/2,251-0036,Kanagawa Fujisawa-shi Enoshima OOO,0712-9999-9999

Tanaka,Saburo,1962/10/2,123-0000,Tokyo Adachi-ku OOO,03-9988-9999

...

Yamada,Hanako,2002/1/2,111-1136,Tokyo Shinjuku-ku Shinjuku OOO,03-1211-9899

FIG. 18

PARAMETER SETTING APPARATUS, COMPUTATION APPARATUS, METHOD, PROGRAM, AND RECODING MEDIUM THEREOF

TECHNICAL FIELD

The present invention relates to a calculation technique for a character string of a text file.

BACKGROUND ART

There is a known format of a text file in which one or more records are included, each of the records includes one or more cells (sometimes referred to as 'fields') having an arbitrary length, and each of the cells includes the arbitrary pieces of characters (see Non-Patent Literature 1, for example). When a specific calculation process (see Non-Patent Literatures 2 and 3, for example) is performed on values described in each cell of such a text file in parallel, the number of records and the number of parallels handled in one unit process need to be identified. At this time, in order to efficiently perform the calculation process, not only the main memory size and the cache memory size of the computation apparatus that performs the calculation process but also a position and a length of each record and each cell of the inputted text file have to be taken into account.

PRIOR ART LITERATURE

Non-Patent Literature

Non-patent Literature 1: Y. Shafranovich, "RFC4180: Common Format and MIME Type for Comma-Separated Values (CSV) Files," [online], October, 2005, SolidMatrix Technologies, Inc., [searched on Jan. 6, 2018], Internet <http://www.ietf.org/rfc/rfc4180.txt>

Non-patent Literature 2: Dai Ikarashi, Koji Chida, Koki Hamada, Katsumi Takahashi, "Secure Database Operations Using An Improved 3-party Verifiable Secure Function Evaluation", In SCIS 2011, 2011.

Non-patent Literature 3: A. Shamir, "How to Share a Secret", Communications of the ACM, November 1979, Volume 22, Number 11, pp. 612-613.

SUMMARY OF THE INVENTION

Problems to be Solved by the Invention

However, a length of each cell of such a text file is arbitrarily defined, and the text file often does not include information indicating a position and a length of each cell. Therefore, character strings of an inputted text file have to be read in sequence from the beginning so as to specify a position and a length of each cell. Thus, it is not easy to specify the number of records handled in one unit process and the number of parallels in a calculation process and efficiently perform the calculation process while taking into account a position and a length of each record and each cell of a text file.

The present invention has been made in view of such a point and an object of the present invention is to efficiently perform a calculation process to a text file in which one or more records are included, each of the records includes one or more cells having an arbitrary length, and each of the cells includes arbitrary pieces of characters.

Means to Solve the Problems

To solve the above-described problems, a parameter setting apparatus for a calculation process to character strings of a text file is provided. Here, the text file includes W pieces of records, each of the records includes G pieces of cells having an arbitrary length, and each of the cells includes arbitrary pieces of characters. W and G are an integer which is 1 or greater and the G pieces of cells correspond to attribute information. C is a cache memory size and M is a main memory size. The parameter setting apparatus includes a maximum size setting unit, a minimum size setting unit, an encoding size setting unit, a calculation size setting unit, a reference size setting unit, a process unit calculation unit, and a parallel number calculation unit. The maximum size setting unit sets a maximum value $S_{csv}$ of a size of character strings for one record of the text file by using the attribute information as an input. The minimum size setting unit sets a minimum value $s_{csv}$ of the size of character strings for one record by using the attribute information as an input. The encoding size setting unit sets a maximum value $S_{enc}$ of a total size of encode information obtained by encoding the character strings for one record into an element of a predetermined finite set. The calculation size setting unit sets a maximum value $S_{ss}$ of a total size of a calculation value obtained by performing specific calculation to the encode information for one record. Here, the encoding and the calculation are a process being executed for every process unit character string which is a character string for r records of the text file. The reference size setting unit sets a total size $S_{ref}$ of reference information indicating a position and a length of each of the cells for one record. The process unit calculation unit obtains a function value of $C/(S_{csv}+S_{enc}+S_{ref})$ as the number r of records. The parallel number calculation unit obtains a function value of $f_0/I \cdot r \cdot S_{csv}$ as the number $n_p$ of parallels in the calculation process. Here, I is a maximum value of the number of repetition times of the encoding and the calculation, which are executed for every process unit character string, $\max(S_{ref}, S_{ss})=S_{ref}$ holds when $S_{ref} \geq S_{ss}$, $\max(S_{ref}, S_{ss})=S_{ss}$ holds when $S_{ref} < S_{ss}$, and $f_0$ is a function value of $s_{csv} \cdot M/(s_{csv}+S_{enc}+\max(S_{ref}, S_{ss}))$.

Effects of the Invention

Accordingly, a calculation process can be efficiently performed to a text file in which one or more records are included, each of the records includes one or more cells having an arbitrary length, and each of the cells includes arbitrary pieces of characters.

BRIEF DESCRIPTION OF THE DRAWINGS

FIG. 9 is a conceptual diagram for illustrating a text file according to the embodiment.

FIG. 10 is a conceptual diagram for illustrating a text file according to the embodiment.

FIG. 15 is a conceptual diagram for illustrating a text file according to the embodiment.

FIG. 16 is a conceptual diagram for illustrating a text file according to the embodiment.

FIG. 18 is a conceptual diagram for illustrating a text file according to the embodiment.

DETAILED DESCRIPTION OF THE EMBODIMENTS

Figure 1:
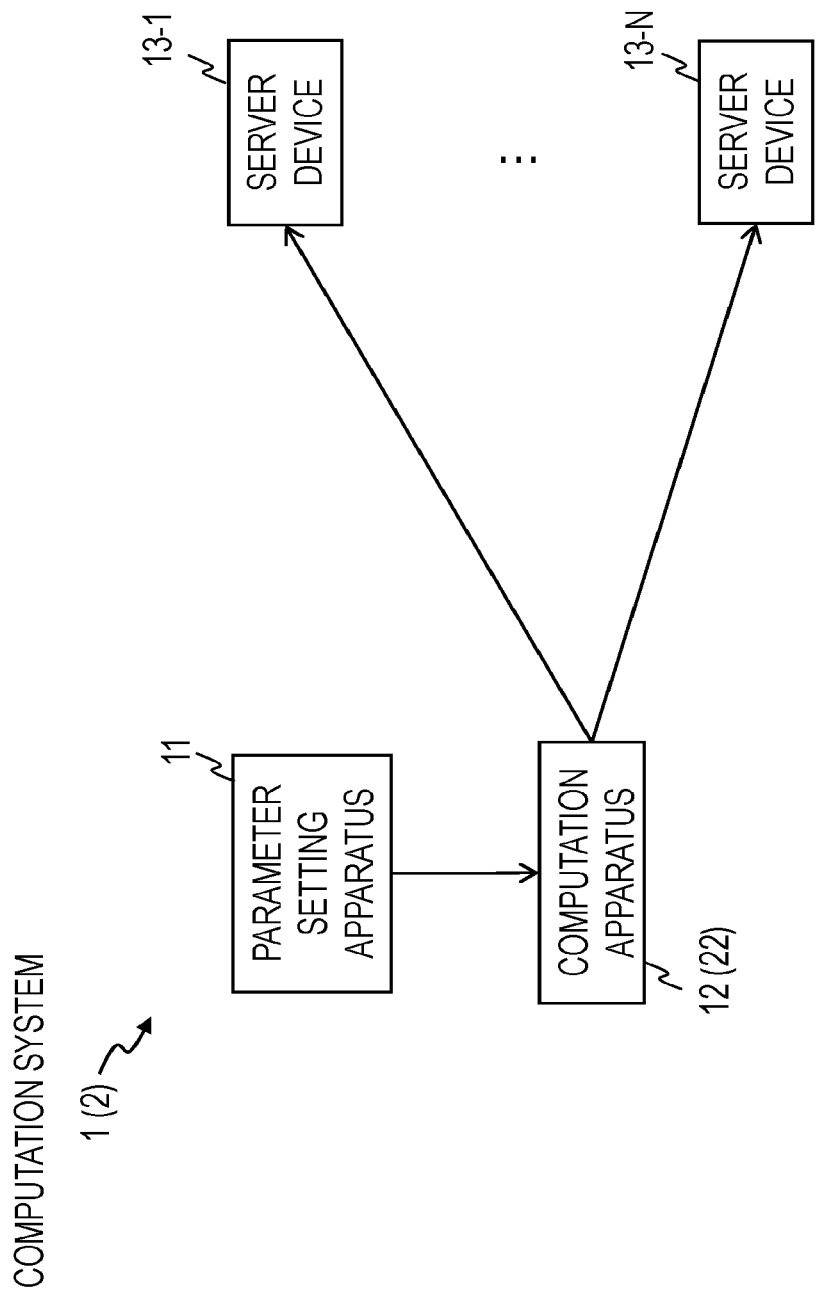
FIG. 1 is a block diagram illustrating a computation system according to embodiments.

Embodiments according to the present invention are described below.

Outline

The outline is first described.

Text File

A calculation process to a character string of a text file is performed in each embodiment. This text file includes W pieces of records, each of the records includes G pieces of cells having an arbitrary length, and each of the cells includes arbitrary pieces of characters. However, the length of each cell has an upper limit depending on an attribute of each cell. W and G are integers which are 1 or greater. For example, at least one of W and G is an integer which is 2 or greater. W may be an integer which is 2 or greater, G may be an integer which is 2 or greater, or both of W and G may be integers which are 2 or greater. When W is an integer which is 2 or greater, there is information for specifying a partition of records between mutually-adjacent records. For example, there is a line break between records which are adjacent to each other and a plurality of records are separated from each other by line breaks. Further, when G is an integer which is 2 or greater, there is information for specifying a partition of cells between mutually-adjacent cells. For example, there is a delimiter or a line break between cells which are adjacent to each other and a plurality of cells are separated from each other by delimiters or line breaks. An example of a delimiter is a comma ','. As other examples, there may be a tab or a line break between cells which are adjacent to each other or there may be an en space or a line break between cells which are adjacent to each other. When W is an integer which is 2 or greater, the numbers of pieces G of cells included in respective records are identical to each other. G pieces of cells of each record correspond to attribute information (also referred to as 'schema'). Attribute information indicates information of an attribute of each cell and includes at least information for specifying or estimating the maximum value and the minimum value of the size (amount of data) of a character string indicated by each cell. For example, attribute information includes information indicating what kind of element of a finite set a cell indicates. For instance, attribute information may indicate that 'a cell indicates remainders modulo p (mod p) (p is a positive integer)', may indicate that 'a cell is a character string which is expressed by members of predetermined pieces (10 pieces, for example) of predetermined finite fields (extension field $GF(2^8)$, for example)', or may indicate that 'a cell is a character string indicating a predetermined integer-type integer (a signed 32-bit integer, for example)'. G pieces of attribute information may respectively correspond to G pieces of cells of each record (that is, one piece of attribute information may indicate an attribute of one cell) or one piece of attribute information may correspond to a plurality of pieces (G pieces, for example) of cells of each record (that is, one piece of attribute information may indicate attributes of a plurality of pieces of cells). In the former case, attributes of a plurality of cells belonging to one record may be different from each other or may be identical to each other. Further, when W is an integer which is 2 or greater, 'G pieces of sets of attributes' corresponding to G pieces of cells of all records are identical to each other. That is, attributes att(g) of the g-th (where g=1, . . . G) cells included in all records are identical to each other. Also, attribute information may express a type of information indicated by a cell. Further, attribute information may be included in a text file (for example, a header of a text file may be attribute information) or does not have to be included in a text file. Examples of a text file include a comma-separated values (CSV) file, a tab-separated values (TSV) file, and space-separated values (SSV) file. These are collectively referred to as a character-separated values (CSV) file or a delimiter-separated values (DSV) file.

Parameter Setting Apparatus

The parameter setting apparatus sets and outputs a parameter for a 'calculation process' to character strings of a text file. This 'calculation process' may be any process. Examples of the 'calculation process' include a secret sharing process, a secure computation process (see Non-Patent Literatures 1 and 2, for example), an encryption process, and a signature generation process. A parameter set by the parameter setting apparatus is the number of records handled in one unit process and the number of parallels in a calculation process. Preferably, the parameter setting apparatus also sets a file buffer size for data which is collectively read from a text file. A cache memory size of a cache memory of a computation apparatus which performs a calculation process to character strings of a text file (storage capacity of the cache memory) is denoted by C and a main memory size of a main memory (storage capacity of the main memory) is denoted by M, below.

The parameter setting apparatus includes a maximum size setting unit, a minimum size setting unit, an encoding size setting unit, a calculation size setting unit, a reference size setting unit, a process unit calculation unit, and a parallel number calculation unit. When a file buffer size is also set, the parameter setting apparatus further includes a buffer size calculation unit.

The maximum size setting unit sets and outputs the maximum value $S_{csv}$ of the size of character strings for one record of a text file by using attribute information as an input. The maximum value $S_{csv}$ is a record size obtained by estimating the size of character strings for each record of a text file relatively large. That is, the maximum value $S_{csv}$ is obtained by adding up the maximum values of the sizes (or estimation values of the sizes) of respective cells, which are indicated by attribute information, for one record. As described above, attribute information includes information for specifying or estimating the maximum value of a size of a character string expressed in each cell and the maximum size setting unit sets the maximum value $S_{csv}$ by using thig information. For example, when attribute information indicates that 'a cell is a character string indicating a signed 32-bit integer', the maximum value of the size of the cell is 11 bytes (1 byte for the sign+10 bytes for an 11-digit integer).

The minimum size setting unit sets and outputs the minimum value $s_{csv}$ of the size of character strings for one record by using attribute information as an input. The minimum value $s_{csv}$ is a record size obtained by estimating the size of character strings for each record of a text file relatively small. That is, the minimum value $s_{csv}$ is obtained by adding up the minimum values of the sizes (or estimation values of the sizes) of respective cells, which are indicated by attribute information, for one record. As described above, attribute information includes information for specifying or estimating the minimum value of a size of a character string expressed in each cell and the minimum size setting unit sets the minimum value $s_{csv}$ by using this information. For example, when attribute information indicates that 'a cell is a character string indicating a signed 32-bit integer', the minimum value of the size of the cell is 1 byte.

The encoding size setting unit sets and outputs the maximum value $S_{enc}$ of the total size of encode information which is obtained by encoding (converting) character strings for one record into an element of a predetermined finite set. The maximum value $S_{enc}$ is a record size obtained by estimating the total size of encode information for one record relatively large. Examples of a 'predetermined finite set' to which encode information belongs include a finite set indicated by remainders modulo p (mod p), a finite set of values expressed by predetermined bits, and a finite set expressed by the predetermined number of bits of predetermined integer-type integers. The 'predetermined finite set' is preliminarily defined depending on contents of the 'calculation' described below. The maximum value $S_{enc}$ is specified from a predetermined finite set to which encode information belongs and attribute information, for example. For example, when attribute information indicates that 'a cell indicates remainders modulo $2^{61}$ (mod $2^{61}$)' and the character string of this cell is encoded to encode information expressed by the remainders modulo $2^{61}$ (mod $2^{61}$), the maximum size of encode information corresponding to this cell is 8 bytes. A predetermined finite set to which encode information belongs is preliminarily defined, for example.

The calculation size setting unit sets and outputs the maximum value $S_{ss}$ of the total size of calculation values obtained by performing specific 'calculation' to encode information for one record. The maximum value $S_{ss}$ is a record size obtained by estimating the total size of calculation values for one record relatively large. Examples of the 'calculation' include secret sharing, secure computation, encryption, and signature generation. 'Calculation' may be performed by using each cell as an operand or may be performed by using a plurality of cells as operands. The maximum value $S_{ss}$ is specified from a predetermined finite set to which encode information belongs, contents of 'calculation', and attribute information, for example. For instance, when attribute information indicates that 'a cell indicates remainders modulo $2^{61}$ (mod $2^{61}$)' and the character string of this cell is encoded to encode information expressed by the remainders modulo $2^{61}$ (mod $2^{61}$) and 'calculation' is for performing secret sharing of a value of each cell into N (where N is a positive integer) pieces of parties with Shamir's secret sharing scheme (Non-Patent Literature 3, for example), the maximum size of a calculation value corresponding to this cell is 8N bytes.

The reference size setting unit sets and outputs the total size $S_{ref}$ of reference information indicating positions and lengths of respective cells for one record in a text file. A 'position of a cell' may be a position of a first character of a cell, may be a position of a last character of a cell, or may be a position of another character in a cell, for example. 'Information indicating a position of a cell' may be the number of characters from the first character of a character string of a text file to a character on a 'position of a cell' or may be a function value of this number of characters, for example. 'Information indicating a length of a cell' may be the number of characters of a cell or may be a function value of this number of characters, for example. Reference information is specified based on attribute information, for example. This is because the number of cells belonging to one record can be specified based on attribute information. A data size required for indicating a position and a length of each cell is defined depending on a format for expressing them. For example, when a position and a length of each cell are indicated by an unsigned 64-bit integer, reference information of each cell is 16 bytes.

The above-described 'encoding' and 'calculation' are executed for every process unit character string which is a character string for r records of a text file. A process executed for every process unit character string is referred to as a 'unit process'. The process unit calculation unit obtains a 'function value of $C/(S_{csv}+S_{enc}+S_{ref})$' indicating the number r of records which are processed in one unit process (obtains a function value of $C/(S_{csv}+S_{enc}+S_{ref})$ as the number r of records) and outputs the function value of $C/(S_{csv}+S_{enc}+S_{ref})$. The cache memory size C may be preliminarily defined or may be inputted. The maximum value $S_{csv}$ is obtained in the maximum size setting unit, the maximum value $S_{enc}$ is obtained in the encoding size setting unit, and the total size $S_{ref}$ is obtained in the reference size setting unit. A 'function value of $\alpha$' may be $\alpha$ itself or may be some other value corresponding to $\alpha$. Examples of a 'function value of $\alpha$' include the minimum integer which is $\alpha$ or greater, the maximum integer which is $\alpha$ or smaller, and an integer which is closest to $\alpha$. For example, $r=C/(S_{csv}+S_{enc}+S_{ref})$ may be established, $r=\text{ROUNDUP}(C/(S_{csv}+S_{enc}+S_{ref}))$ may be established, $r=\text{ROUNDDOWN}(C/(S_{csv}+S_{enc}+S_{ref}))$ may be established, or $r=\text{ROUND}(C/(S_{csv}+S_{enc}+S_{ref}))$ may be established. Here, ROUNDUP($\alpha$) is a roundup function for rounding up $\alpha$ to an integer value, ROUNDDOWN($\alpha$) is a round-down function for rounding down $\alpha$ to an integer value, and ROUND($\alpha$) is a round function for rounding $\alpha$ to an integer which is closest to $\alpha$. Here, $S_{csv}+S_{enc}+S_{ref}$ indicates a memory size required for a process through which a processing unit reads character strings for one record from a text file, encodes the character strings to encode information while referring to reference information, and performs 'calculation' such as secret sharing (referred to below as 'a series of processing for one record'). If this memory size is equal to or smaller than a cache memory size, a series of processing for one record can be executed at high speed without reading data from the main memory in the middle of the series of processing. $C/(S_{csv}+S_{enc}+S_{ref})$ indicates the memory size ($S_{csv}+S_{enc}+S_{ref}$), corresponding to the required number of times of 'a series of processing for one record', that can be secured in the cache memory. By setting character strings of the number r of records corresponding to $C/(S_{csv}+S_{enc}+S_{ref})$ to a process unit character string, the number of times of accessing to the main memory in performing a process for r records can be reduced and calculation can be performed at high speed.

The parallel number calculation unit obtains a 'function value of $f_0/I \cdot r \cdot S_{csv}$' indicating the number $n_p$ of parallels in a calculation process (obtains a function value of $f_0/I \cdot r \cdot S_{csv}$ as the number $n_p$ of parallels) and outputs the function value of $f_0/I \cdot r \cdot S_{csv}$. For example, $n_p = f_0/I \cdot r \cdot S_{csv}$ may be established, $n_p = \text{ROUNDUP}(f_0/I \cdot r \cdot S_{csv})$ may be established, $n_p = \text{ROUNDDOWN}(f_0/I \cdot r \cdot S_{csv})$ may be established, or $n_p = \text{ROUND}(f_0/I \cdot r \cdot S_{csv})$ may be established. $f_0$ is a function value of $s_{csv} \cdot M/(s_{csv}+S_{enc}+\max(S_{ref},S_{ss}))$. For example, $f_0 = s_{csv} \cdot M/(s_{csv}+S_{enc}+\max(S_{ref},S_{ss}))$ may be established, $f_0 = \text{ROUNDUP}(s_{csv} \cdot M/(s_{csv}+S_{enc}+\max(S_{ref},S_{ss})))$ may be established, $f_0 = \text{ROUNDDOWN}(s_{csv} \cdot M/(s_{csv}+S_{enc}+\max(S_{ref},S_{ss})))$ may be established, or $f_0 = \text{ROUND}(s_{csv} \cdot M/(s_{csv}+S_{enc}+\max(S_{ref},S_{ss})))$ may be established. Here, $\max(S_{ref},S_{ss})=S_{ref}$ holds when $S_{ref} \geq S_{ss}$ and $\max(S_{ref},S_{ss})=S_{ss}$ holds when $S_{ref} \leq S_{ss}$. I is the maximum value of the number of repetition times of 'encoding' and 'calculation' executed for every process unit character string. For example, I is the number of repetition times of 'encoding' and 'calculation' executed for every process unit character string. The main memory size M may be preliminarily defined or may be inputted. The minimum value $s_{csv}$ is set in the minimum size setting unit, the maximum value $S_{enc}$ is set in the encoding size setting unit, the maximum value $S_{ss}$ is set in the calculation size setting unit, the total size $S_{ref}$ is set in the reference size setting unit, and the maximum value I of the number of repetition times is preliminarily defined. Preferably, the maximum value I of the number of repetition times is defined so that a ratio of the total processing amount (sum of the number of calculation) of preprocessing to the total processing amount for performing 'encoding' and 'calculation' of a process unit character string which is a character string for r records is equal to or smaller than a predetermined value. r may be obtained in the process unit calculation unit or obtained based on C, $S_{csv}$, $S_{enc}$, and $S_{ref}$. That is, as long as a function value of $f_0/I \cdot r \cdot S_{csv}$ can be obtained, r which is obtained in the process unit calculation unit is not necessarily used for generating the function value of $f_0/I \cdot r \cdot S_{csv}$. Here, $X=(s_{csv}+S_{enc}+\max(S_{ref},S_{ss}))/s_{csv}$ indicates how many times the memory size required for a series of processing for one record is as large as the memory size of character strings for one record read from a text file, at the maximum. Therefore, $S_{csv} \cdot X$ indicates the maximum value of the memory size required for a series of processing for one record and $I \cdot r \cdot S_{csv} \cdot X$ indicates the maximum value of the memory size required for repeating a series of processing for r records I times. $f_0$ is a function value of $s_{csv} \cdot M/(s_{csv}+S_{enc}+\max(S_{ref},S_{ss}))=M/X$, so that $f_0/I \cdot r \cdot S_{csv}$ indicates how many times the main memory size M is as large as the memory size required for processing for repeating 'a series of processing for r records (processing for performing 'a series of processing for one record' for r records)' I times. Thus, buffer overflow of the main memory can be suppressed by setting a value corresponding to $f_0/I \cdot r \cdot S_{csv}$ to the number $n_p$ of parallels. Note that reference information is required in encoding, so that a region for $S_{ref}$ needs to be secured in the main memory. On the other hand, reference information is not required in 'calculation' such as secret sharing after encoding, but a region for $S_{ss}$ for storing obtained calculation values needs to be secured in the main memory. That is, the regions for $S_{ref}$ and $S_{ss}$ are not required at the same time. It is enough if the region for $\max(S_{ref},S_{ss})$ can be secured in the main memory.

The buffer size calculation unit obtains a 'function value of $f_0/n_p$' indicating the file buffer size f of data which is collectively read from character strings of a text file in a calculation process (obtains a function value of $f_0/n_p$ as the file buffer size f) and outputs the function value of $f_0/n_p$. For example, $f=f_0/n_p$ may be established, $f=\text{ROUNDUP}(f_0/n_p)$ may be established, $f=\text{ROUNDDOWN}(f_0/n_p)$ may be established, or $f=\text{ROUND}(f_0/n_p)$ may be established. $f_0$ is as described above, and $n_p$ may be obtained in the parallel number calculation unit or may be obtained based on $f_0$, I, r, and $S_{csv}$. That is, as long as a function value of $f_0/n_p$ can be obtained, $n_p$ which is obtained in the parallel number calculation unit is not necessarily used for generating the function value of $f_0/n_p$. Here, when $n_p=f_0/I \cdot r \cdot S_{csv}$, $f_0/n_p=I \cdot r \cdot S_{csv}$ is established. This corresponds to the file buffer size f of character strings read from a text file for repeating the process for r records I times. Larger file buffer size f brings approximate sequential acceleration and realizes high speed but requires larger storage capacity of the main memory. The file buffer size f obtained as described above realizes high-speed processing under the restriction of the main memory size M which is preliminarily defined.

Computation Apparatus (General Version)

A computation apparatus performs a calculation process to character strings of an inputted text file. The computation apparatus uses the number r of records and the number $n_p$ of parallels, which are obtained in the parameter setting apparatus, in the calculation process. When the file buffer size f is further obtained in the parameter setting apparatus, the computation apparatus further uses the file buffer size f, which is obtained in the parameter setting apparatus, in the calculation process. When the file buffer size f is not obtained in the parameter setting apparatus, the computation apparatus may use a value which is preliminarily defined as the file buffer size f or some other file buffer size f corresponding to attribute information may be used.

There is a case where a text file includes a character which is not a target of 'calculation' such as secret sharing. For example, a comma in a CSV file is a character indicating a partition between cells and is not a target of 'calculation'. A character string of a cell is sometimes closed by double quotation marks '"' and '"' in a CSV file, and double quotation marks are not targets of 'calculation' either. A character indicating a line break (for example, \n) and the like are not targets of 'calculation' either (double quotation marks '"' and '"' are not included in a cell). Characters which are not thus targets of 'calculation' are referred to as 'special characters'. There is also a format in which an escape character is added in front of a special character in a cell so as to allow the special character to be handled as a character which is a target of 'calculation'. In such a case, it is sometimes impossible to determine whether or not each character in a cell independently indicates that the character is a target of 'calculation' and accordingly, a partition between cells sometimes cannot be determined. For example, there is a format in which '"' is further added as an escape character when a double quotation mark '"' is used as a target of 'calculation'. For example, when a value '123"456' in a cell is set to a target of 'calculation', the cell is sometimes described as "123" "456". In such a case, a partition between cells cannot be determined unless the cell "123" "456" is read from the head in sequence. When only the latter half "456" is read in, for example, it is impossible to determine whether this is one cell indicating '456' or this is a part of a cell indicating a value including '"456'. Also, there is a format to further add '\' as an escape character when characters '\n' indicating a line break is used as a target of 'calculation'. For example, when a value '123\n456' in a cell is set to a target of 'calculation', the cell is sometimes described as "123\\n456". In this case, a partition between cells cannot be determined unless the cell "123\\n456" is read from the head in sequence. In such a case, processing for specifying positions and lengths of respective cells of a text file cannot be performed in parallel, and therefore, the processing has to be performed from the head of the text file in sequence.

The computation apparatus applicable for a text file having such a format includes a main memory, a cache memory, and a plurality of processing units. Each of the processing units includes a read-in unit, a file read-in lock releasing unit, a parsing unit, a buffer boundary lock releasing unit, an encoding unit, a calculation unit, and a parallelism lock releasing unit. These plurality of processing units are assigned to processing for any thread. A processing unit performing processing for a thread i performs processing below. Here, i denotes each thread, $i \in \{0, \ldots, T-1\}$ holds, T is a positive integer indicating the number of threads corresponding to the size TS of character strings of a text file, and $1 \le n_p \le T$ holds. For example, for the size $TS_i$ of character strings read from a text file in each thread i, $TS=TS_0+\ldots+TS_{T-1}$ or $TS \le TS_0+\ldots+TS_{T-1}$ is satisfied, or $f \cdot T \ge TS$ is satisfied. Further, it is assumed that a file read-in lock and a buffer boundary lock of the thread 0 and a parallelism lock of the threads $0, \ldots, n_p-1$ are released in an initial state.

After the file read-in lock and the parallelism lock of the thread i are released, the read-in unit reads a character string $S_i$, which can be stored in a region of the file buffer size f, from character strings of a text file and stores the character string $S_i$ in the main memory. When $i=0$, the character string $S_0$ is a 'character string which has an amount of data to be able to be stored in a region of the file buffer size f' and the head of which is the first character of a text file. When $i \ge 1$, the character string $S_i$ is a 'character string which has an amount of data to be able to be stored in a region of the file buffer size f' and the head of which is a character coming immediately after a termination character of the character string $S_{i-1}$ which is read in the thread i−1. A 'character string being able to be stored in a region of the file buffer size f' may be the longest character string which can be stored in the region of the file buffer size f or may be the longest character string which can be stored in a region of the size obtained by subtracting a coefficient from the file buffer size f, for example.

After the character string $S_i$ is stored in the main memory, the file read-in lock releasing unit releases a file read-in lock of a thread i+1. Accordingly, access to the main memory in multiple threads can be prevented from competing with each other. Here, there is no thread corresponding to i+1>T and a file read-in lock of non-existent thread is not released.

After a buffer boundary lock of the thread i is released, the parsing unit calculates reference information indicating positions and lengths of respective cells included in the character string $S_i$ and stores the reference information in the main memory. For example, the parsing unit specifies each cell of the character string $S_i$ and calculates reference information of each specified cell to store the reference information in the main memory. For instance, the parsing unit specifies each cell based on information positioned on a boundary of cells (a delimiter or a line break, for example) and calculates reference information of the each specified cell so as to store the reference information in the main memory. When $i=0$, there are a case where a termination character included in the character string $S_0$ is a termination of a cell and a case where the termination character included in the character string $S_0$ is not a termination of a cell. In the case where the termination character included in the character string $S_0$ is not a termination of a cell, a cell including the termination character cannot be specified in the thread 0 and reference information of the cell cannot be calculated either. When $i \ge 1$, there are cases where a start-end character of the character string $S_i$ is a start end of a cell and where the start-end character of the character string $S_i$ is not a start end of a cell and there are cases where a termination character included in the character string $S_i$ is a termination of a cell and where the termination character included in the character string $S_i$ is not a termination of a cell. In the case where a start-end character of the character string $S_i$ is not a start end of cells, a cell including the start-end character of the character string $S_i$ cannot be specified only from the character string $S_i$. In this case, the parsing unit specifies the cell including the start-end character of the character string $S_i$ by using characters which are not included in the cells specified in the thread i−1 in the character string and the character string $S_i$. In the case where the termination character included in the character string $S_i$ is not a termination of a cell, a cell including the termination character cannot be specified in the thread i and reference information of the cell cannot be calculated either. Note that the termination character included in the character string $S_{T-1}$ on the termination of text data is a termination of a cell. Use of reference information corresponding to a specified cell makes it possible to specify a record to which the cell belongs and an attribute which corresponds to the cell (information indicating an order of the attribute from the beginning of the record, for example). When there is not enough region to store reference information in the main memory, the parsing unit collectively secures a buffer region for storing reference information for r records in the main memory. Predetermined processing (overhead) is required for securing a buffer region. Not by securing a buffer region for every record but by collectively securing a buffer region for every r records corresponding to a unit process, a variable-length record can be processed while suppressing overhead.

After reference information indicating positions and lengths of respective cells included in the character string $S_i$ is calculated, the buffer boundary lock releasing unit releases a buffer boundary lock of the thread i+1. There is no thread corresponding to i+1>T and a buffer boundary lock of non-existent thread is not released.

After the release of the buffer boundary lock of the thread i+1, the encoding unit performs processing, in which a process unit character string $PS_{i,j}$ which is a character string for r records, which are processing targets and included in a concatenated character string $CS_i$, is selected from text data based on information specified based on reference information and the selected process unit character string $PS_{i,j}$ is encoded into encode information $E_{i,j}$ which is an element of a predetermined finite set, by using the cache memory. A start end of the process unit character string $PS_{i,j}$ is a start end of any record and a termination of the process unit character string $PS_{i,j}$ is a termination of any record. A concatenated character string $CS_0$ when $i=0$ is $S_0$, the concatenated character string $CS_i$ when $i \ge 1$ is obtained by concatenating the character string $S_i$ immediately after the concatenated character string $CS_{i-1}$, J is a positive integer, and j=0, . . . , J−1 holds. When the number of characters of the character string $S_i$ is equal to or larger than the number of characters for r records, for example, the encoding unit selects the process unit character string $PS_{i,j}$ from the character string $S_i$ or selects the process unit character string $PS_{i,j}$ from a character string obtained by concatenating the character string $S_i$ with the character string $S_{i-1}$. When the number of characters of the character string $S_i$ is smaller than the number of characters for r records, the encoding unit selects the process unit character string $PS_{i,j}$ from a character string obtained by concatenating from the character string $S_i$ to the character string $S_{i'}$. Here, $0 \le i' \le i-1$ holds. When i=0, the encoding unit selects process unit character strings $PS_{0,0}, \ldots, PS_{0,J-1}$ from the head of the character string $S_0$. When i≥1, the encoding unit selects process unit character strings $PS_{i,0}, \ldots, PS_{i,J-1}$, the head of which is a character which is not selected as a process unit character string, in the character strings $S_{i-1}$. When J≥2, $PS_{i,j}$ follows immediately after $PS_{i,j-1}$.

The encoding unit performs encoding for every process unit character string $PS_{i,j}$. Data are aligned in a code-oriented manner in text data (data are aligned in an order of record 1, record 2, . . . , record W) and all records correspond to an identical 'set of attributes'. Processing speed is generally higher in successively processing the same kinds of data than in successively processing different kinds of data. Therefore, it is desirable that the encoding unit successively performs encoding of r pieces of cells for r records corresponding to the same attribute information in the process unit character string $PS_{i,j}$. The encoding unit selects the process unit character string $PS_{i,j}$ based on information specified from reference information and encodes the selected process unit character string $PS_{i,j}$ to encode information $E_{i,j}$. Calculation is performed in a manner to store reference information for r records, the process unit character string $PS_{i,j}$, and the encode information $E_{i,j}$, which are required in the process of this processing, in the cache memory, enabling high-speed processing. Such processing is realized by using the number r of records corresponding to $C/(S_{csv}+S_{enc}+S_{ref})$ as described above.

The calculation unit performs processing, in which specific 'calculation' is performed to the encode information $E_{i,j}$ to obtain a calculation value $SS_{i,j}$ and the calculation value $SS_{i,j}$ is stored in the main memory, by using the cache memory. It is desirable that the calculation unit successively performs 'calculation' corresponding to r pieces of cells for r records corresponding to identical attribute information. In the process of this processing as well, calculation is performed in a manner to store reference information for r records, the process unit character string $PS_{i,j}$, and the encode information $E_{i,j}$ in the cache memory, enabling high-speed processing.

After the calculation value $SS_{i,j}$ is obtained, the parallelism lock releasing unit releases a parallelism lock of a thread $i+n_p$. Here, there are no threads corresponding to $i+n_p>T$ and a parallelism lock of non-existent thread is not released. Then, the processing unit which has been performing the processing for the thread i is released and the processing unit becomes to be able to perform processing for another thread.

Computation Apparatus (High-Speed Version)

When each cell of a text file includes only characters which make it possible to determine whether or not the characters independently indicate that the characters are targets of 'calculation', processing for specifying positions and lengths of respective cells of the text file can be performed in parallel, realizing higher-speed calculation. For example, such parallel processing can be performed for a text file using no escape characters. A computation apparatus applicable for such a text file includes a main memory, a cache memory, and a plurality of processing units. Each of the processing units includes a read-in unit, a file read-in lock releasing unit, a parsing unit, a cell specifying unit, a buffer boundary lock releasing unit, an encoding unit, a calculation unit, and a parallelism lock releasing unit.

These plurality of processing units are assigned to processing for any thread. A processing unit performing processing for a thread i performs processing below. It is assumed that a file read-in lock and a buffer boundary lock of the thread 0 and a parallelism lock of the threads 0, . . . , n−1 are released in an initial state.

After the file read-in lock and the parallelism lock of the thread i are released, the read-in unit reads a character string $S_i$, which can be stored in a region of the file buffer size f, from character strings of a text file and stores the character string $S_i$ in the main memory. Details of the processing are the same as those of the computation apparatus (general version).

After the character string $S_1$ is stored in the main memory, the file read-in lock releasing unit releases a file read-in lock of a thread i+1. Details of the processing are the same as those of the computation apparatus (general version).

The parsing unit calculates reference information indicating positions and lengths of respective cells included in the character string $S_i$ and stores the reference information in the main memory. The parsing unit is capable of starting this processing before a buffer boundary lock of the thread i is released. That is, when i≥1, the parsing unit can start calculation of reference information indicating positions and lengths of respective cells included in the character string $S_i$ before calculation of reference information indicating positions and lengths of respective cells included in the character string $S_{i-1}$ is finished. For example, the parsing unit specifies cells of the character string $S_i$ and calculates reference information of each of the specified cells to store the reference information in the main memory. For instance, the parsing unit specifies cells based on information positioned on a boundary of cells (a delimiter or a line break, for example) and calculates reference information of each of the specified cells so as to store the reference information in the main memory. When i=0, there are a case where a termination character included in the character string $S_0$ is a termination of a cell and a case where the termination character included in the character string $S_0$ is not a termination of a cell. In the case where the termination character included in the character string $S_0$ is not a termination of a cell, the parsing unit cannot specify a cell including the termination character and cannot calculate reference information of the cell either. When i≥1, there are cases where a start-end character of the character string $S_i$ is a start end of a cell and where the start-end character of the character string $S_i$ is not a start end of a cell and there are cases where a termination character included in the character string $S_i$ is a termination of a cell and where the termination character included in the character string $S_i$ is not a termination of a cell. In the case where a start-end character of the character string $S_i$ is not a start end of a cell, the parsing unit cannot specify a cell including the start-end character of the character string $S_i$ and cannot calculate reference information of the cell either. In the case where the termination character included in the character string $S_i$ is not a termination of a cell, the parsing unit cannot specify a cell including the termination character and cannot calculate reference information of the cell either. Note that the termination character included in the character string $S_{T-1}$ on the termination is a termination of a cell. Further, when there is not enough region to store reference information in the main memory, the parsing unit collectively secures a buffer region for storing reference information for r records in the main memory. Accordingly, a variable-length record can be processed while suppressing overhead.

When $i \geq 1$, the character string $S_i$ is a character string coining immediately after the character string $S_{i-1}$. When $i \geq 1$, after the buffer boundary lock of the thread i is released, the cell specifying unit obtains information $A_i$ corresponding to a position of a cell coining immediately after the last cell included in the character string $S_{i-1}$ by using the reference information and the character string $S_{i-1}$ and the character string $S_i$ and stores the information $A_i$ in the main memory. The information $A_i$ may be information indicating a record to which a cell coining immediately after the last cell included in the character string $S_{i-1}$ belongs and information indicating an attribute corresponding to the cell (for example, information indicating an order of an attribute, to which the cell corresponds, from the beginning of the record), or may be information indicating a position and a length of the cell coming immediately after the last cell included in the character string $S_{i-1}$. When the termination of the character string $S_{i-1}$ is a termination of a cell, the first cell of the character string $S_i$ is a 'cell coining immediately after the last cell included in the character string $S_{i-1}$'. In this case, storage of the information $A_i$ into the main memory can be omitted. On the other hand, when the termination of the character string $S_{i-1}$ is not a termination of a cell, the cell specifying unit generates a 'cell coining immediately after the last cell included in the character string $S_{i-1}$' by using the character string $S_{i-1}$ and the character string $S_i$ to obtain information $A_i$. Accordingly, information corresponding to a position of a cell which cannot be specified by the parsing unit can be obtained. Based on the reference information and the information $A_i$, a record to which each cell of a text file belongs and an attribute corresponding to the cell (information indicating an order of the attribute from the beginning of the record, for example) can be specified. Note that, when i=0, the cell specifying unit does nothing.

The buffer boundary lock releasing unit releases a buffer boundary lock of the thread i+1 after the information $A_i$ is obtained. Details of the processing are the same as those of the computation apparatus (general version). Then, the processing unit which has been performing the processing for the thread i is released and the processing unit becomes to be able to perform processing for another thread.

After that, the encoding unit performs processing, in which the process unit character string $PS_{i,j}$, which is a character string for r records being processing targets and included in the concatenated character string $CS_i$, is selected based on information specified based on reference information and the information $A_i$ and the process unit character string $PS_{i,j}$ is encoded into the encode information $E_{i,j}$ which is an element of a predetermined finite set, by using the cache memory. Details of the processing are the same as those of the computation apparatus (general version), except for the use of the information $A_i$ in addition to the reference information.

The calculation unit performs processing, in which specific 'calculation' is performed to the encode information $E_{i,j}$ to obtain a calculation value $SS_{i,j}$ and the calculation value $SS_{i,j}$ is stored in the main memory, by using the cache memory. Details of the processing are the same as those of the computation apparatus (general version).

After the calculation value $SS_{i,j}$ is obtained, the parallelism lock releasing unit releases a parallelism lock of the thread $i+n_p$. Details of the processing are the same as those of the computation apparatus (general version).

First Embodiment

The first embodiment is described with reference to the accompanying drawings. The first embodiment describes an example in which a parameter setting apparatus sets the number r of records, the number $n_p$ of parallels, and a file buffer size f which are handled in one unit process and a computation apparatus (general version) performs secret sharing (calculation) of a comma-separated values (CSV) file (text file) in which an escape character can be used. Differences from the matters described so far are mainly described and description of the matters already described is omitted below.

Configuration

As illustrated in FIG. 1, a computation system 1 according to the present embodiment includes a parameter setting apparatus 11, a computation apparatus 12, and N pieces of server apparatuses 13-1 to 13-N. Here, N is a positive integer which is 2 or greater. Information can be transmitted from the parameter setting apparatus 11 to the computation apparatus 12 and information can be transmitted from the computation apparatus 12 to the server apparatuses 13-1 to 13-N. Note that information transmission may be performed via a network, may be performed by using some other communication means, or may be performed via a portable recording medium.

Figure 2:
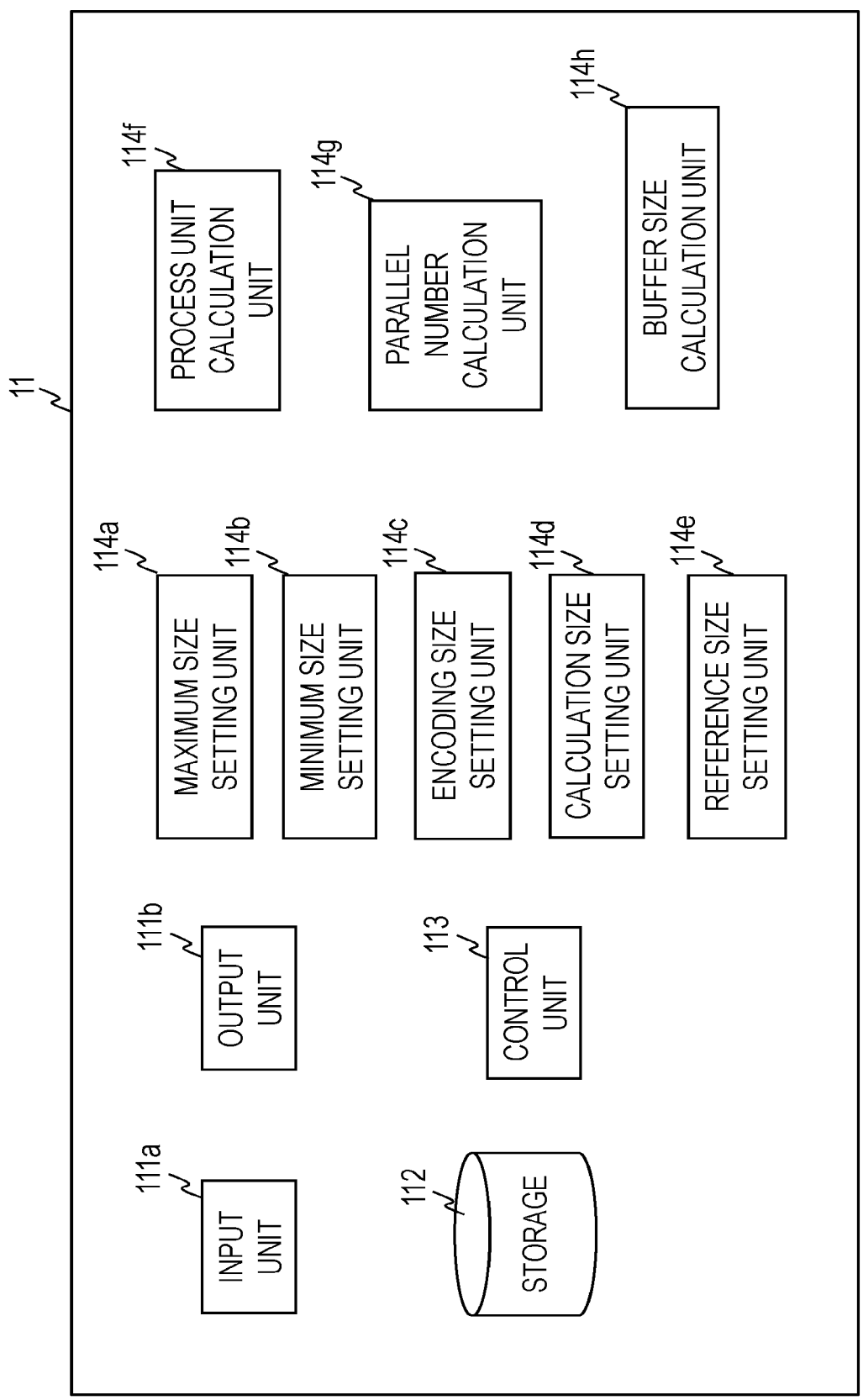
FIG. 2 is a block diagram illustrating a functional configuration of a parameter setting apparatus according to the embodiments.

As illustrated in FIG. 2, the parameter setting apparatus 11 includes an input unit 111a, an output unit 111b, a storage 112, a control unit 113, a maximum size setting unit 114a, a minimum size setting unit 114b, an encoding size setting unit 114c, a calculation size setting unit 114d, a reference size setting unit 114e, a process unit calculation unit 114f, a parallel number calculation unit 114g, and a buffer size calculation unit 114h. The parameter setting apparatus 11 executes each processing under the control of the control unit 113. Each value obtained in the parameter setting apparatus 11 is stored in the storage 112 and is read from the storage 112 to be used for other processing as needed.

Figure 3:
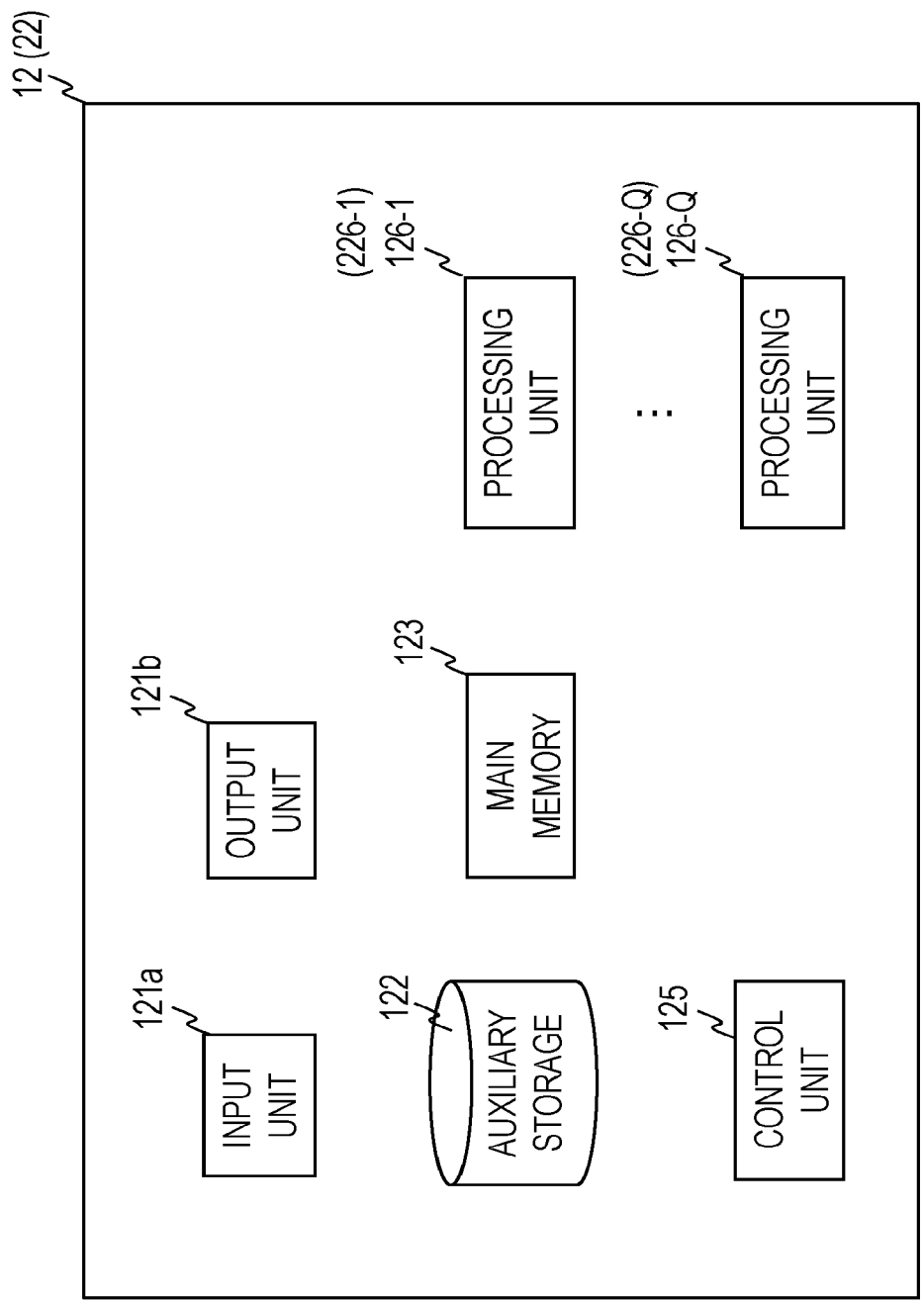
FIG. 3 is a block diagram illustrating a functional configuration of a computation apparatus according to the embodiments.

As illustrated in FIG. 3, the computation apparatus 12 includes an input unit 121a, an output unit 121b, an auxiliary storage 122, a main memory 123, a control unit 125, and processing units 126-1 to 126-Q. Here, Q is an integer which is 2 or greater. The computation apparatus 12 executes each processing under the control of the control unit 125.

Figure 4:
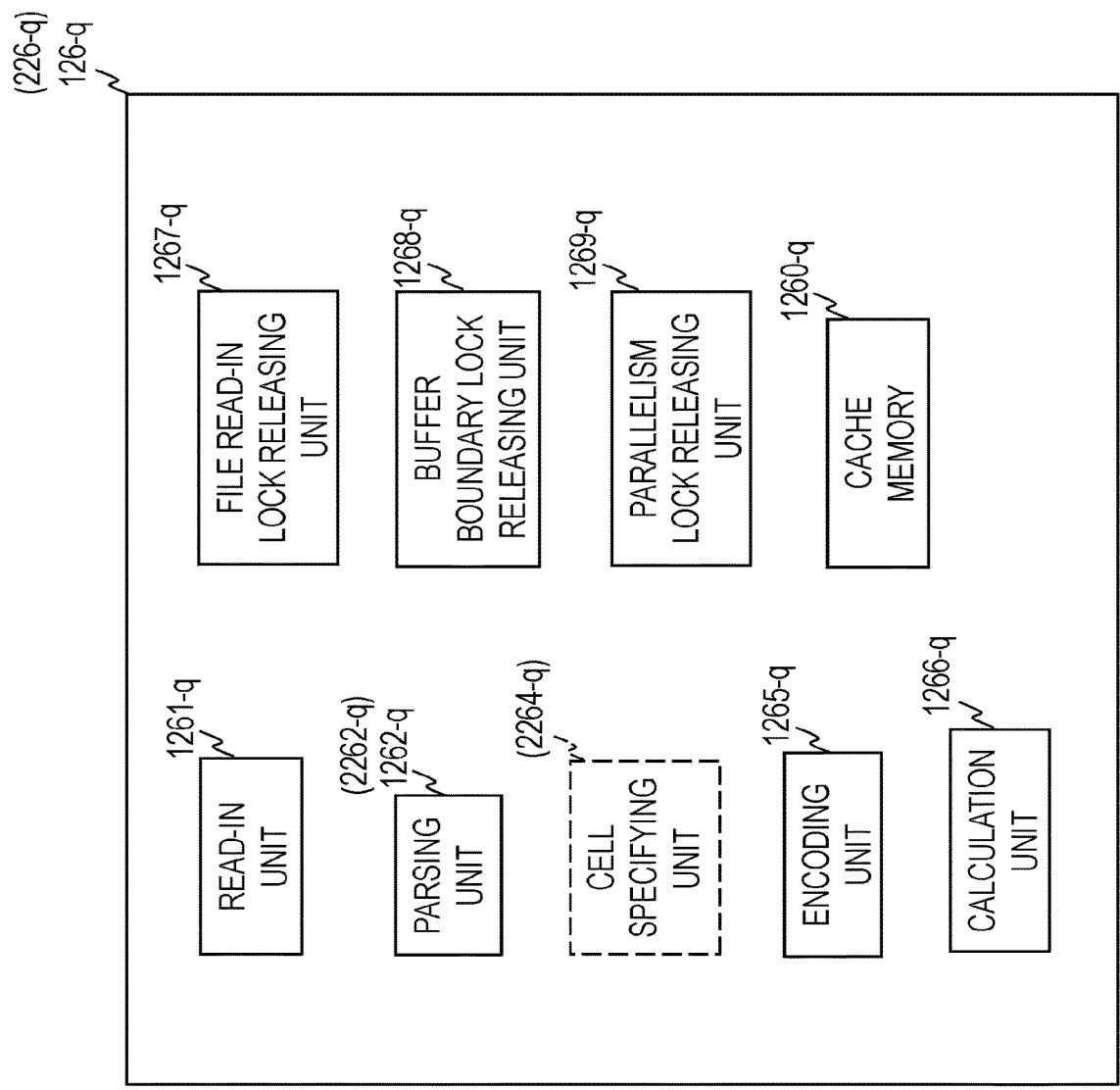
FIG. 4 is a block diagram illustrating a functional configuration of a processing unit according to the embodiments.

As illustrated in FIG. 4, the processing unit 126-q (where q=1, . . . , Q) includes a cache memory 1260-q, a read-in unit 1261-q, a parsing unit 1262-q, an encoding unit 1265-q, a calculation unit 1266-q, a file read-in lock releasing unit 1267-q, a buffer boundary lock releasing unit 1268-q, and a parallelism lock releasing unit 1269-q.

Parameter Setting Process

Figure 5:
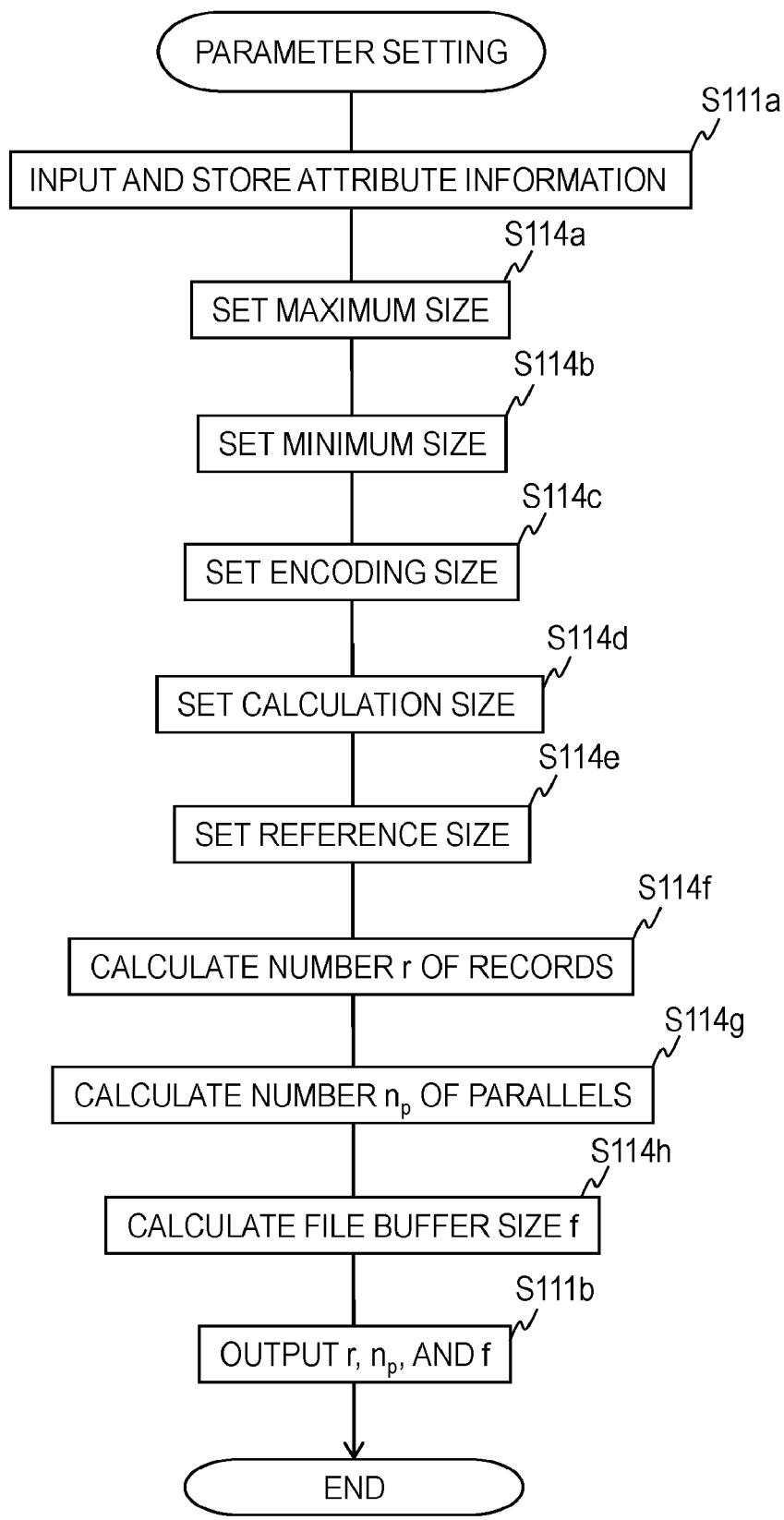
FIG. 5 is a flow diagram for illustrating parameter setting process according to the embodiments.

A parameter setting process of the parameter setting apparatus 11 is described with reference to FIG. 5.

Attribute information of text data which is a target of a calculation process is inputted into the input unit 111a of the parameter setting apparatus 11 (FIG. 2) and is stored in the storage 112. The attribute information may be attribute information read from text data or provided from other than text data (step S111a).

The maximum size setting unit 114a sets the maximum value $S_{csv}$ of the size of character strings for one record of a text file by using the attribute information read from the storage 112 as an input and outputs the maximum value $S_{csv}$ (step S114a).

The minimum size setting unit 114b sets the minimum value $s_{csv}$ of the size of character strings for one record by using the attribute information read from the storage 112 as an input and outputs the minimum value $s_{csv}$ (step S114b).

The encoding size setting unit 114c sets and outputs the maximum value $S_{enc}$ of the total size of encode information obtained by encoding (converting) character strings for one record into an element of a predetermined finite set based on information indicating a 'predetermined finite set' to which encode information belongs, by using the attribute information read from the storage 112 as an input. The 'predetermined finite set' according to the present embodiment to which the encode information belongs is a finite set in which secret-sharing is performed and is preliminarily defined (step S114c).

The calculation size setting unit 114d sets and outputs the maximum value $S_{ss}$ of the total size of secret sharing values (calculation values) obtained through secret sharing (calculation) of encode information for one record, based on a predetermined finite set to which the encode information belongs and the secret sharing scheme, by using the attribute information read from the storage 112 as an input. The secret sharing scheme of the present embodiment is preliminarily defined (step S114d).

The reference size setting unit 114e sets and outputs the total size $S_{ref}$ of reference information indicating positions and lengths of respective cells for one record in a text file, by using the attribute information read from the storage 112 as an input (step S114e).

The process unit calculation unit 114f obtains and outputs a function value r of $C/(S_{csv}+S_{enc}+S_{ref})$ (the number r of records which are processed in one unit process, that is, the number r of records included in a process unit character string), by using $S_{csv}$, $S_{enc}$, and $S_{ref}$ as inputs. The cache memory size C may be preliminarily defined or may be inputted (step S114f).

The parallel number calculation unit 114g obtains and outputs a function value $n_p$ of $f_0/I \cdot r \cdot S_{csv}$ (the number $n_p$ of parallels in the calculation process), by using $S_{csv}$, $s_{csv}$, $S_{ref}$, $S_{enc}$, I, and r as inputs. $f_0$ is a function value of $s_{csv} \cdot M/(s_{csv}+S_{enc}+\max(S_{ref},S_{ss}))$. The main memory size M may be preliminarily defined or may be inputted (step S114g).

The buffer size calculation unit 114h obtains and outputs a function value f of $f_0/n_p$ (the file buffer size f of data collectively read from character strings of a text file in the calculation process), by using $f_0$ and $n_p$ as inputs (step S114h).

The output unit 111b outputs r, $n_p$, and f which are obtained as described above (step S111b).

Calculation Process

The calculation process of the computation apparatus 12 is described with reference to FIGS. 6 to 12.

Figure 6:
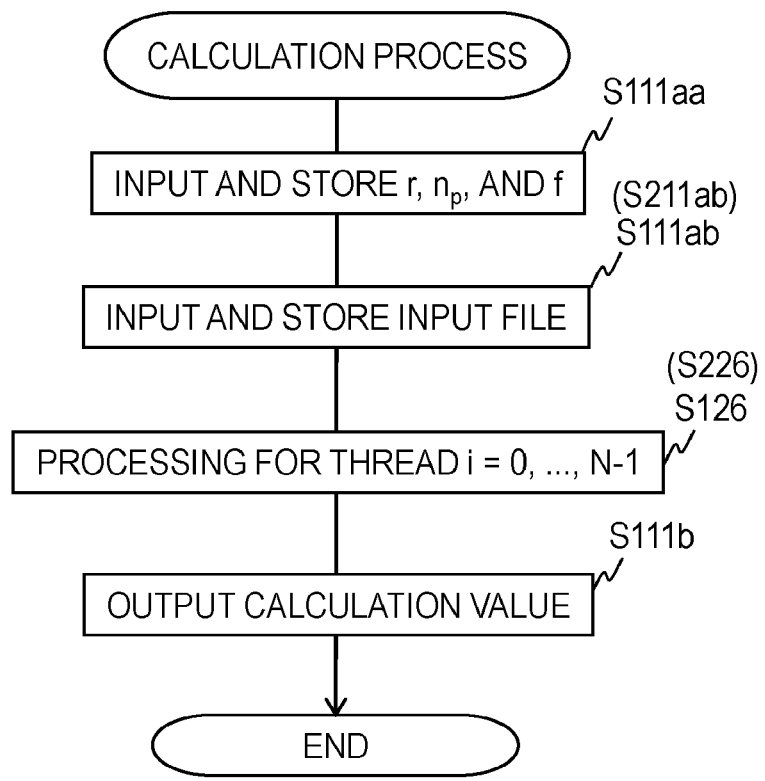
FIG. 6 is a flow diagram for illustrating a calculation process according to the embodiments.

As illustrated in FIG. 6, r, $n_p$, and f which are outputted from the parameter setting apparatus 11 are inputted into the input unit 121a of the computation apparatus 12 (FIG. 3) and stored in the auxiliary storage 122 (step S111aa). Text data which is a target of the calculation process is inputted into the input unit 121a and stored in the auxiliary storage 122. FIGS. 9 to 12 illustrate text data. Text data illustrated in FIG. 9 is a CSV file in which each cell is closed by double quotation marks. When a double quotation mark '"' is used as a value of a cell, '"' is added as an escape character before '"' used as the value of the cell. For example, "4selddks" "k304kdkk400-03d" indicates a value '4selddks"k304kdkk400-03d' which is a secret sharing target. As illustrated in FIG. 10, this text file includes W pieces of records rec(1), rec(W), each record rec(w) (where w=1, . . . , W) includes G pieces of cells cell(w,g) having arbitrary lengths (where g=1, . . . , G), and each of the cells cell(w,g) includes arbitrary pieces of characters. The cell cell(w,g) corresponds to the g-th attribute att(g) from the beginning of the record rec(w) (step S111ab).

After that, r, $n_p$, and f are read in the main memory 123 from the auxiliary storage 122 and the calculation process of the thread i=0, . . . , T−1 is executed. The calculation process is started from the thread i=0. Note that a file read-in lock and a buffer boundary lock of the thread 0 and a parallelism lock of threads 0, . . . , $n_p$−1 are released at an initial state. The control unit 125 assigns the processing units 126-q which are not used among the processing units 126-1 to 126-Q to the threads i and processing for as many threads i as possible is executed in parallel (step S126). Secret sharing values obtained through the processing are outputted from the output unit 121b and respectively transmitted to the server apparatuses 13-1 to 13-N to be respectively stored in the server apparatuses 13-1 to 13-N (step S111b). Details of the processing for the thread i are described below.

Processing for Thread i

Figure 7:
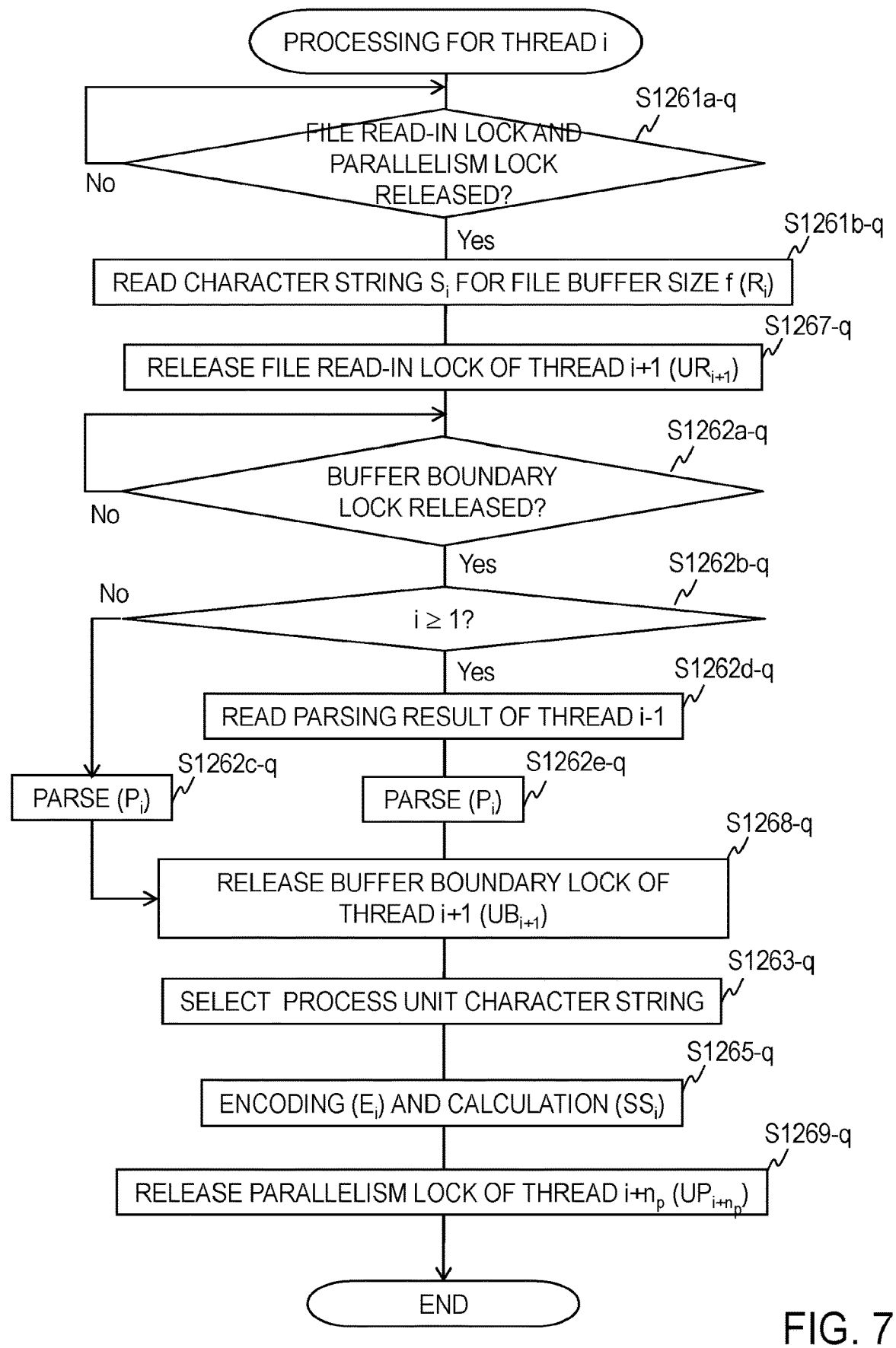
FIG. 7 is a flow diagram for illustrating processing for a thread i according to an embodiment.
Figure 8:
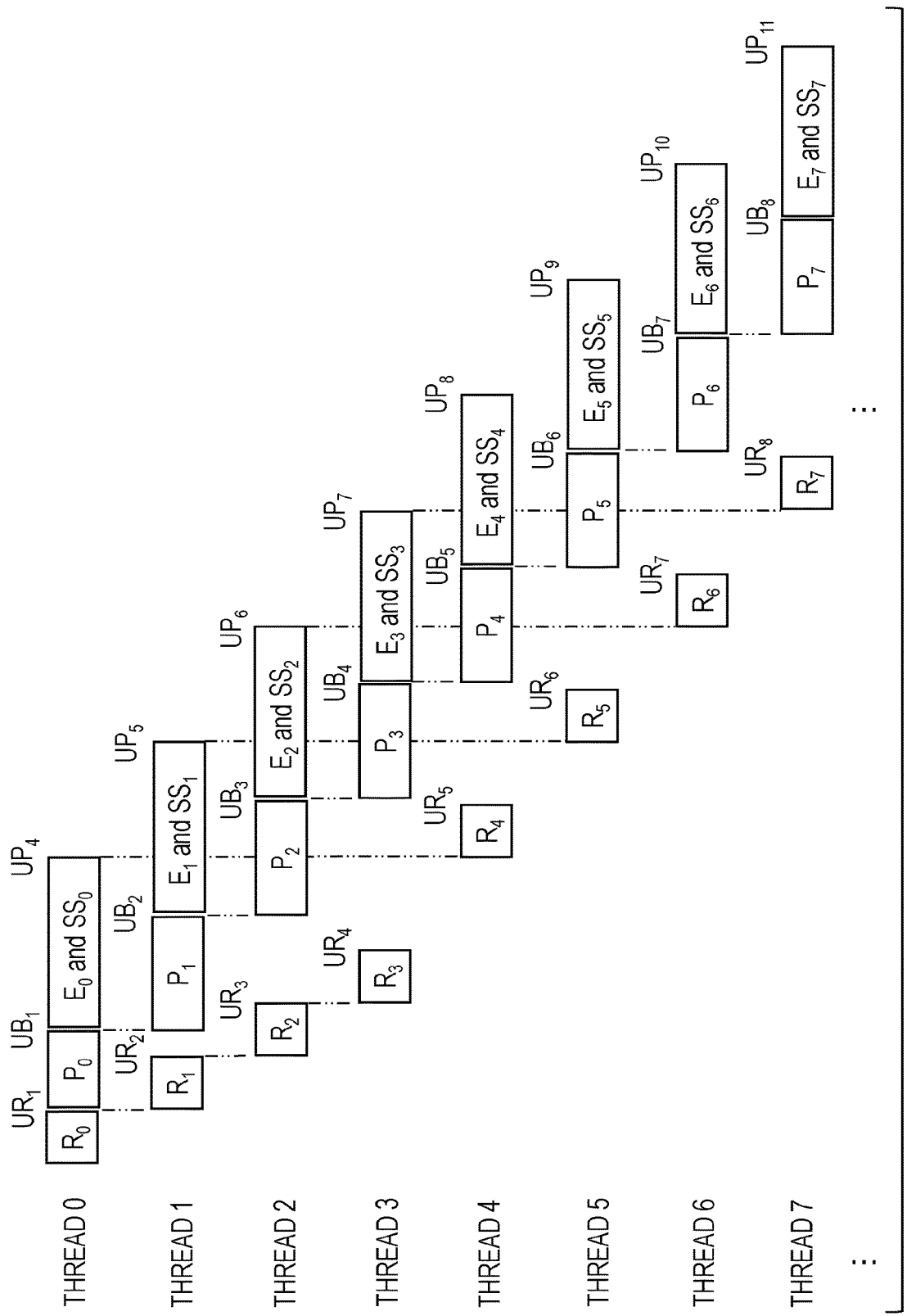
FIG. 8 is a conceptual diagram for illustrating processing for each thread according to the embodiment.

As illustrated in FIGS. 7 and 8, the read-in unit 1261-q of the processing unit 126-q for performing processing for the thread i determines whether both of the file read-in lock and the parallelism lock of the thread i are released. The file read-in lock and the parallelism lock of the thread 0 are released at the initial state (step S1261a-q). When both of the file read-in lock and the parallelism lock of the thread i are not released, the determination of step S1261a-q is repeated.

Figure 11:
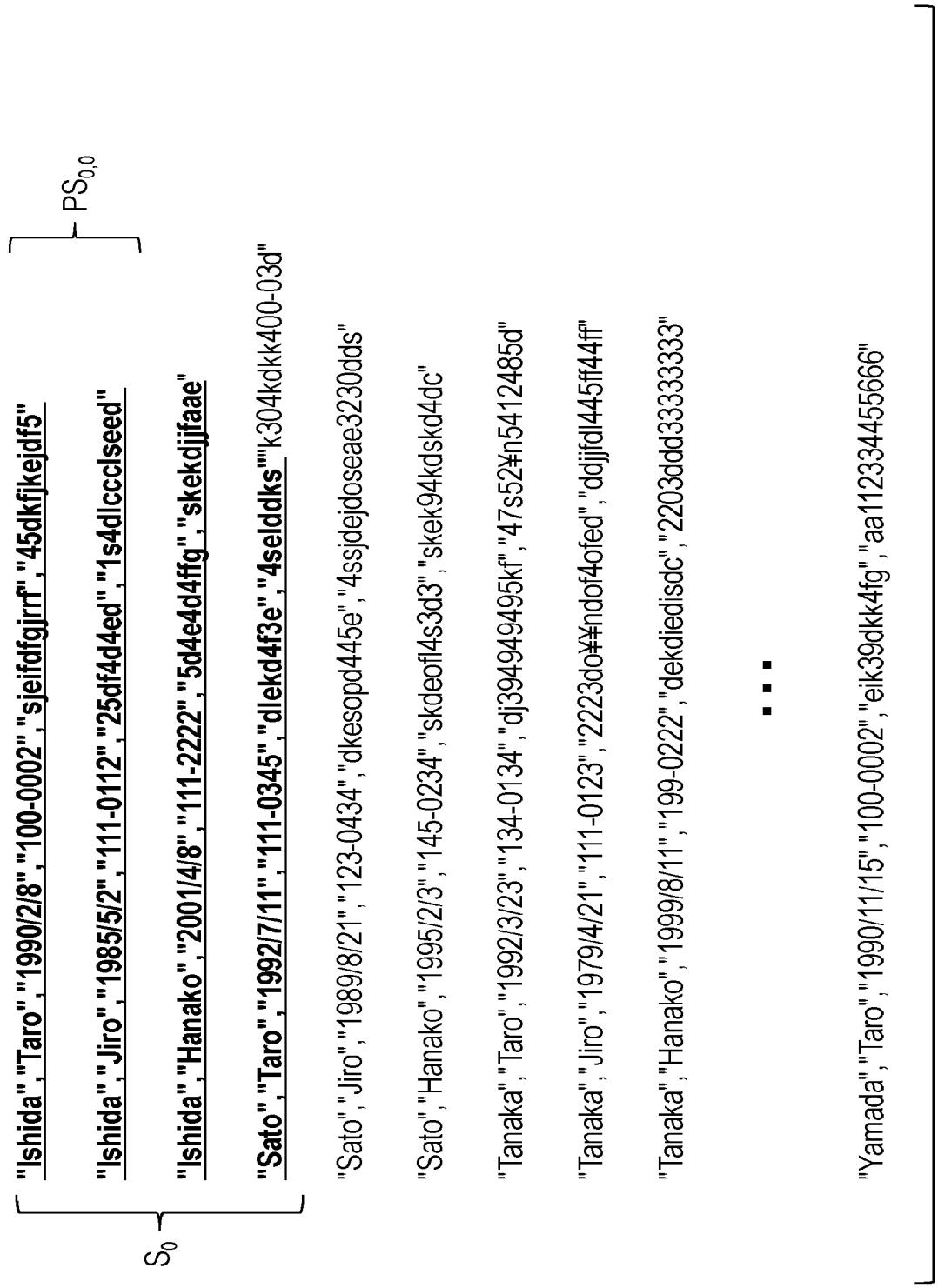
FIG. 11 is a conceptual diagram for illustrating a text file according to the embodiment.

On the other hand, when both of the file read-in lock and the parallelism lock of the thread i are released, the read-in unit 1261-q reads in the file buffer size f from the main memory 123 and secures a region of the file buffer size f in the main memory 123. Further, the read-in unit 1261-q reads in the character string $S_i$ which can be stored in the region of the file buffer size f from character strings of a text file stored in the auxiliary storage 122. In the example of FIG. 11, the followings are read in as the character string $S_0$.

"Ishida","Taro","1990/2/8","100-0002","sjeifdfgjrrf",
 "45dkfjkejdf5"

"Ishida","Jiro","1985/5/2","111-0112","25df4d4ed",
 "1s4dlccclseed"

"Ishida","Hanako","2001/4/8","111-2222",
 "5d4e4d4ffg","skekdjjfaae"

"Sato","Taro","1992/7/11","111-0345","dlekd4f3e",
 "4selddks"

Figure 12:
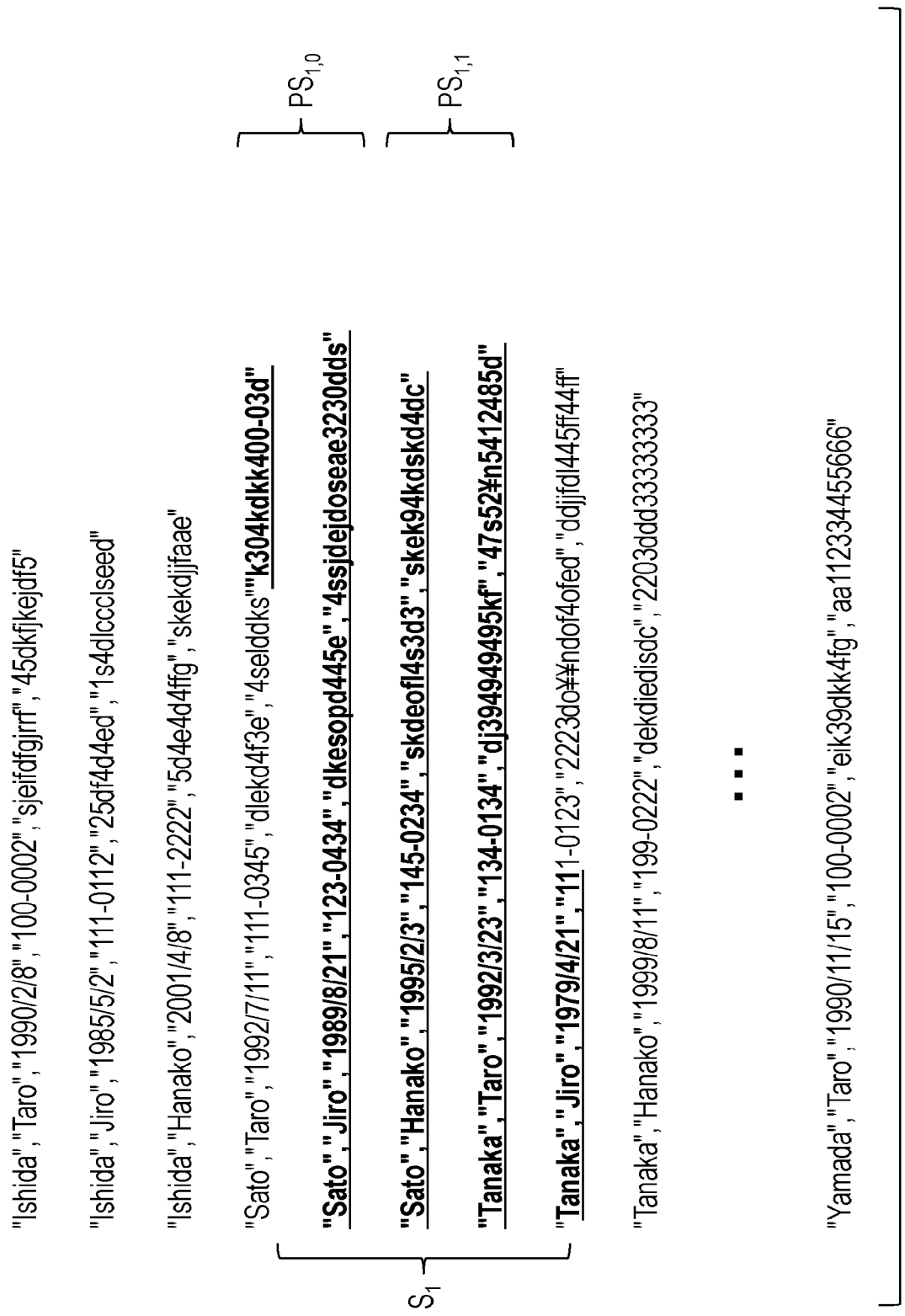
FIG. 12 is a conceptual diagram for illustrating a text file according to the embodiment.

In the example of FIG. 12, the followings are read in as the character string $S_1$.

"k304kdkk400-03d"

"Sato","Jiro","1989/8/21","123-0434","dkesopd445e",
 "4ssjdejdoseae3230dds"

"Sato","Hanako","1995/2/3","145-0234",
"skdeofl4s3d3","skek94kdskd4dc"
"Tanaka","Taro","1992/3/23","134-0134",
"dj394949495kr","47s52\n5412485d"
"Tanaka","Jiro","1979/4/21","11

The read-in unit 1261-$q$ stores the character string $S_i$ in the region of the file buffer size f secured in the main memory 123 (step S1261$b$-$q$ in FIG. 7, $R_i$ in FIG. 8).

After the character string $S_i$ is stored in the main memory 123, the file read-in lock releasing unit 1267-$q$ releases the file read-in lock of the thread i+1 (step S1267-$q$ in FIG. 7, $UR_{i+1}$ in FIG. 8).

The parsing unit 1262-$q$ determines whether or not the buffer boundary lock of the thread i is released. The buffer boundary lock of the thread 0 is released in the initial state (step S1262$a$-$q$). When the buffer boundary lock of the thread i is not released, the determination in step 1262$a$-$q$ is repeated.

On the other hand, when the buffer boundary lock of the thread i is released, the parsing unit 1262-$q$ determines whether or not i≥1 is established (step S1262$b$-$q$). When i≥1 is not established (that is, when i=0), the parsing unit 1262-$q$ parses the character string $S_i$ read from the main memory 123 and calculates reference information indicating positions and lengths of respective cells included in the character string $S_i$ so as to store the reference information in the main memory 123. For example, in the case of the character string $S_0$ illustrated in FIG. 11, the parsing unit 1262-$q$ parses the character string $S_0$, specifies cells: 'Ishida', 'Taro', '1990/2/8', '100-0002', 'sjeifdfgjrrf', '45dkfjkejdf5', 'Ishida', 'Jiro', '1985/5/2', '111-0112', '25df4d4ed', '1s4dlccclseed', 'Ishida', 'Hanako', '2001/4/8', '111-2222', '5d4e4d4ffg', 'skekdjjfaae', 'Sato', 'Taro', '1992/7/11', '111-0345', and 'dlekd4f3e', and calculates reference information of these cells. Since the termination of '"4selddks"' on the last is not a termination of cells, so that reference information of '"4selddks"' is not calculated in the thread 0. When there is not enough region for storing reference information in the main memory 123, the parsing unit 1262-$q$ reads r from the main memory 123 and collectively secures a buffer region for storing reference information for r records in the main memory 123. After that, the processing goes to step S1268-$q$ (step S1262$c$-$q$ in FIG. 7, $P_i$ in FIG. 8). On the other hand, when i≥1 is established, the parsing unit 1262-$q$ reads parsing results in the thread i−1 (reference information of respective specified cells and information for specifying a character which is not included in cells) from the main memory 123 and specifies a character which is not included in the cells specified in the thread i−1 in the character string $S_{i-1}$. When the termination of the character string is a termination of cells, there are no characters which are not included in the cells specified in the thread i−1 in the character string (step S1262$d$-$q$). Then, the parsing unit 1262-$q$ reads out the character string $S_i$ from the main memory 123, parses a character string obtained by concatenating the character which is not included in the cells specified in the thread i−1 with the character string $S_i$, calculates reference information indicating positions and lengths of respective cells included in this character string, and stores the reference information in the main memory 123. When the termination of the character string $S_{i-1}$ is a termination of cells, the parsing unit 1262-$q$ parses the character string $S_i$, calculates reference information indicating positions and lengths of respective cells included in the character string $S_i$, and stores the reference information in the main memory 123. For example, in the cases of the character strings $S_0$ and $S_1$ illustrated in FIG. 11 and FIG. 12, the parsing unit 1262-$q$ parses a character string:
"4selddks" "k304kdkk400-03d"
"Sato","Jiro","1989/8/21","123-0434", "dkesopd445e",
"4ssjdejdoseae3230dds"
"Sato","Hanako","1995/2/3","145-0234",
"skdeofl4s3d3","skek94kdskd4dc"
"Tanaka","Taro","1992/3/23","134-0134",
"dj394949495kf","47s52\n5412485d"
"Tanaka","Jiro","1979/4/21","11
which are obtained by concatenating characters '"4selddks"' which are not included in the cells specified in the thread i−1 in the character string with the character string $S_{i-1}$, calculates reference information indicating positions and lengths of respective cells: '4selddks" "k304kdkk400-03d', 'Sato', 'Jiro', '1989/8/21', '123-0434', 'dkesopd445e', '4ssjdejdoseae3230dds', 'Sato', 'Hanako', '1995/2/3', '145-0234', 'skdeofl4s3d3', 'skek94kdskd4dc', 'Tanaka', 'Taro', '1992/3/23', '134-0134', 'dj394949495kf', '47s52\n5412485d', 'Tanaka', 'Jiro', and '1979/4/21' which are included in this character string, and stores the reference information in the main memory 123. Since the termination of "11 on the last is not a termination of cells, reference information of "11 is not calculated in the thread 1. When there is not enough region for storing reference information in the main memory 123, the parsing unit 1262-$q$ reads r from the main memory 123 and collectively secures a buffer region for storing reference information for r records in the main memory 123. After that, the processing goes to step S1268-$q$ (step S1262$e$-$q$ in FIG. 7, $P_i$ in FIG. 8).

In step S1268-$q$, the buffer boundary lock releasing unit 1268-$q$ releases the buffer boundary lock of the thread i+1. However, there are no threads corresponding to i+1>T and a buffer boundary lock of non-existent thread is not released (step S1268-$q$ in FIG. 7, $UB_{i+1}$ in FIG. 8).

Then, the encoding unit 1265-$q$ selects the process unit character string $PS_{i,j}$ (where j=0, . . . , J−1), which is a character string for r records being processing targets and included in the concatenated character string $CS_i$, from text data based on information specified based on the reference information and stores the process unit character string $PS_{i,j}$ and reference information for r records corresponding to the process unit character string $PS_{i,j}$ in the cache memory 1260-$q$. In the examples of FIG. 11 and FIG. 12 in which r=2, the process unit character string $PS_{0,0}$ is selected from the concatenated character string $CS_0=S_0$ and the process unit character strings $PS_{1,0}$ and $PS_{1,1}$ are selected from the concatenated character string $CS_1=S_0+S_1$ (step S1263-$q$). The encoding unit 1265-$q$ encodes the process unit character string $PS_{i,j}$ into the encode information $E_{i,j}$ which is an element of a predetermined finite set, by using the process unit character string $PS_{i,j}$ and the reference information in the cache memory 1260-$q$, and stores the encode information $E_{i,j}$ in the cache memory 1260-$q$ (step S1265-$q$ in FIG. 7, $E_i$ in FIG. 8).

The calculation unit 1266-$q$ performs secret sharing of the encode information $E_{i,j}$ read from the cache memory 1260-$q$ so as to obtain a secret sharing value (calculation value) $SS_{i,j}$ and stores the secret sharing value $SS_{i,j}$ in the main memory 123. At this time, the reference information for r records corresponding to the process unit character string $PS_{i,j}$ does not have to be stored in the main memory 123, so that the secret sharing values $SS_{i,0}$ . . . , $SS_{i,J-1}$ may be overwritten on the region in which the reference information for r records has been stored (step S1265-$q$ in FIG. 7, $SS_i$ in FIG. 8).

After that, the parallelism lock releasing unit 1269-$q$ reads in $n_p$ from the main memory 123 and releases the parallelism lock of the thread i+$n_p$. Here, there are no threads corresponding to i+$n_p$>T and a parallelism lock of non-existent thread is not released. Then, the control unit 125 releases the assignment of the processing units 126-$q$ to the threads i. Accordingly, the processing units 126-$q$ become to be able to be assigned to other threads (step S1269-$q$ in FIG. 7, UP$_{i+np}$ in FIG. 8).

Second Embodiment

The second embodiment describes an example in which a parameter setting apparatus sets the number r of records, the number $n_p$ of parallels, and a file buffer size f which are handled in one unit process and a computation apparatus (high-speed version) performs secret sharing (calculation) of a comma-separated values (CSV) file (text file) in which use of an escape character is inhibited.

Configuration

As illustrated in FIG. 1, a computation system 2 according to the present embodiment includes a parameter setting apparatus 11, a computation apparatus 22, and N pieces of server apparatuses 13-1 to 13-N. Information can be transmitted from the parameter setting apparatus 11 to the computation apparatus 22 and information can be transmitted from the computation apparatus 22 to the server apparatuses 13-1 to 13-N.

As illustrated in FIG. 2, the parameter setting apparatus 11 includes an input unit 111$a$, an output unit 111$b$, a storage 112, a control unit 113, a maximum size setting unit 114$a$, a minimum size setting unit 114$b$, an encoding size setting unit 114$c$, a calculation size setting unit 114$d$, a reference size setting unit 114$e$, a process unit calculation unit 114$f$, a parallel number calculation unit 114$g$, and a buffer size calculation unit 114$h$. The parameter setting apparatus 11 executes each processing under the control of the control unit 113. Each value obtained in the parameter setting apparatus 11 is stored in the storage 112 and is read from the storage 112 to be used for other processing as needed.

As illustrated in FIG. 3, the computation apparatus 22 includes an input unit 121$a$, an output unit 121$b$, an auxiliary storage 122, a main memory 123, a control unit 125, and processing units 226-1 to 226-Q. Here, Q is an integer which is 2 or greater. The computation apparatus 22 executes each processing under the control of the control unit 125.

As illustrated in FIG. 4, the processing unit 226-$q$ (where q=1, . . . , Q) includes a cache memory 1260-$q$, a read-in unit 1261-$q$, a parsing unit 2262-$q$, a cell specifying unit 2264-$q$, an encoding unit 1265-$q$, a calculation unit 1266-$q$, a file read-in lock releasing unit 1267-$q$, a buffer boundary lock releasing unit 1268-$q$, and a parallelism lock releasing unit 1269-$q$.

Parameter Setting Process

Same as the first embodiment.

Calculation Process

The calculation process of the computation apparatus 22 is described with reference to FIG. 6 and FIGS. 13 to 18.

As illustrated in FIG. 6, r, $n_p$, and f which are outputted from the parameter setting apparatus 11 are inputted into the input unit 121$a$ of the computation apparatus 22 (FIG. 3) and stored in the auxiliary storage 122 (step S111$aa$). Text data which is a target of the calculation process is inputted into the input unit 121$a$ and stored in the auxiliary storage 122. FIGS. 15 to 18 illustrate text data. Text data illustrated in FIG. 15 is a CSV file in which each cell is not closed by double quotation marks. An escape character is not allowed to be used in text data of the present embodiment and each cell only includes characters which make it possible to determine whether or not the cell independently indicates a target of secret sharing (calculation). As illustrated in FIG. 16, this text file includes W pieces of records rec(1), rec(W), each record rec(w) (where w=1, . . . , W) includes G pieces of cells cell(w,g) having arbitrary lengths (where g=1, . . . , G), and each of the cells cell(w,g) includes arbitrary pieces of characters. The cell cell(w,g) corresponds to the g-th attribute att(g) from the beginning of the record rec(w) (step S211$ab$).

After that, r, $n_p$, and f are read in the main memory 123 from the auxiliary storage 122 and the calculation process of the thread i=0, . . . , T−1 is executed. The calculation process is started from the thread i=0. Note that a file read-in lock of the thread 0 and a parallelism lock of the threads 0, . . . , $n_p$−1 are released at an initial state. The control unit 125 assigns the processing units 226-$q$ which are not used among the processing units 226-1 to 226-Q to the threads i and processing for as many threads i as possible is executed in parallel (step S226). Secret sharing values obtained through the processing are outputted from the output unit 121$b$ and respectively transmitted to the server apparatuses 13-1 to 13-N to be respectively stored in the server apparatuses 13-1 to 13-N (step S111$b$). Details of the processing for the thread i are described below.

Processing for Thread i

Figure 13:
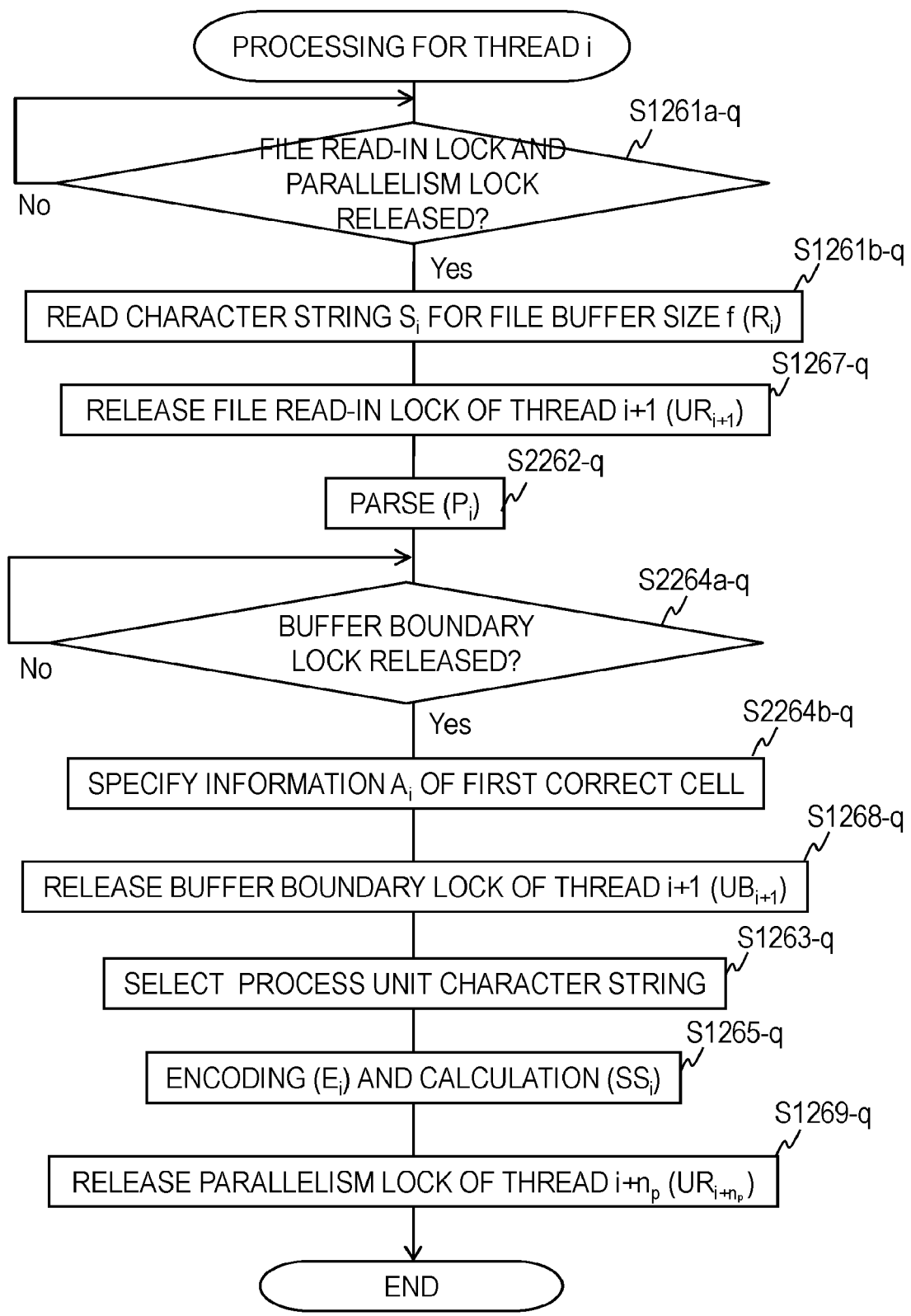
FIG. 13 is a flow diagram for illustrating processing for a thread i according to an embodiment.
Figure 14:
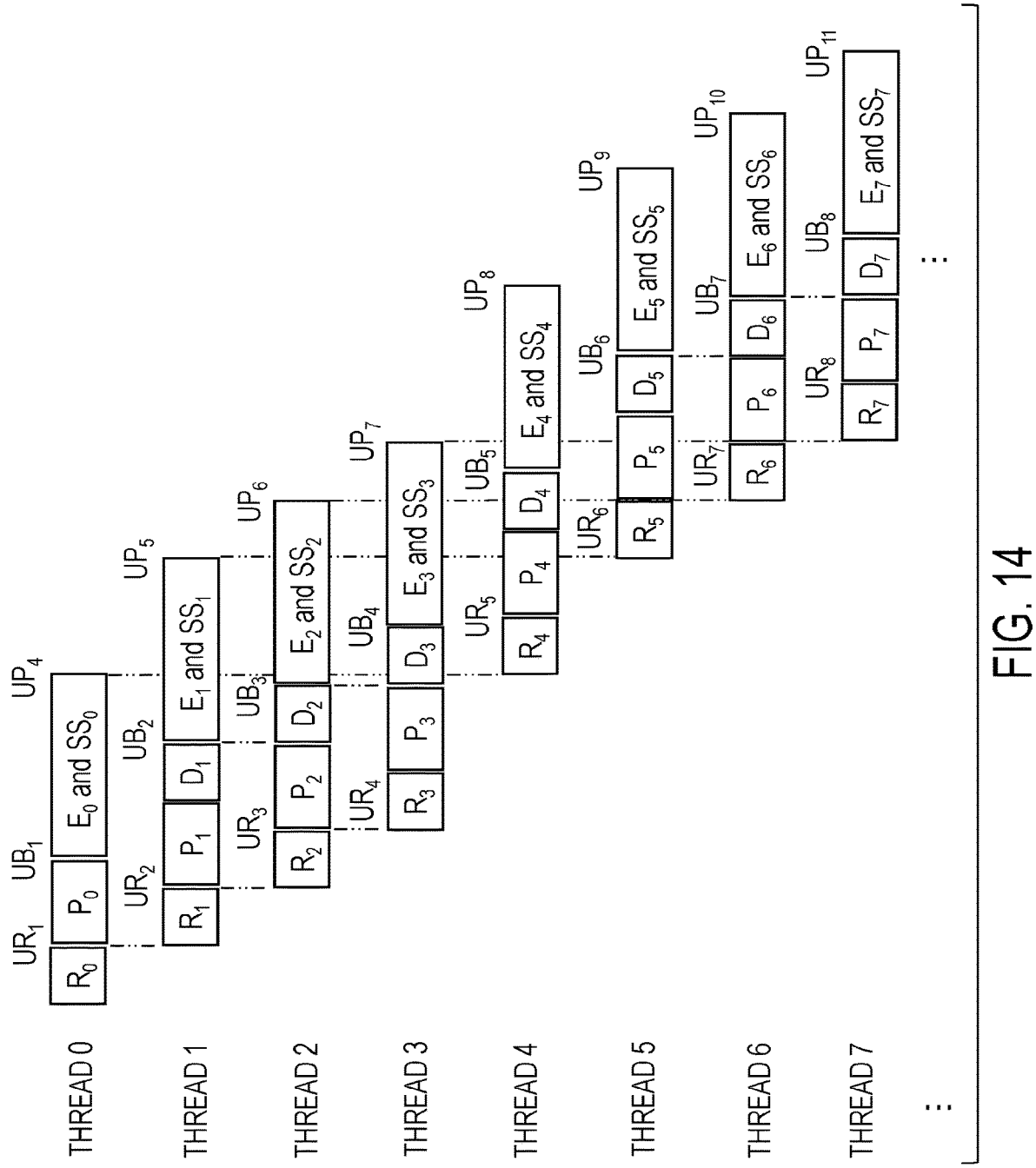
FIG. 14 is a conceptual diagram for illustrating processing for each thread according to the embodiment.

As illustrated in FIGS. 13 and 14, the read-in unit 1261-$q$ of the processing unit 226-$q$ for performing processing for the thread i determines whether both of the file read-in lock and the parallelism lock of the thread i are released. The file read-in lock and the parallelism lock of the thread 0 are released at the initial state (step S1261$a$-$q$). When both of the file read-in lock and the parallelism lock of the thread i are not released, the determination of step S1261$a$-$q$ is repeated.

Figure 17:
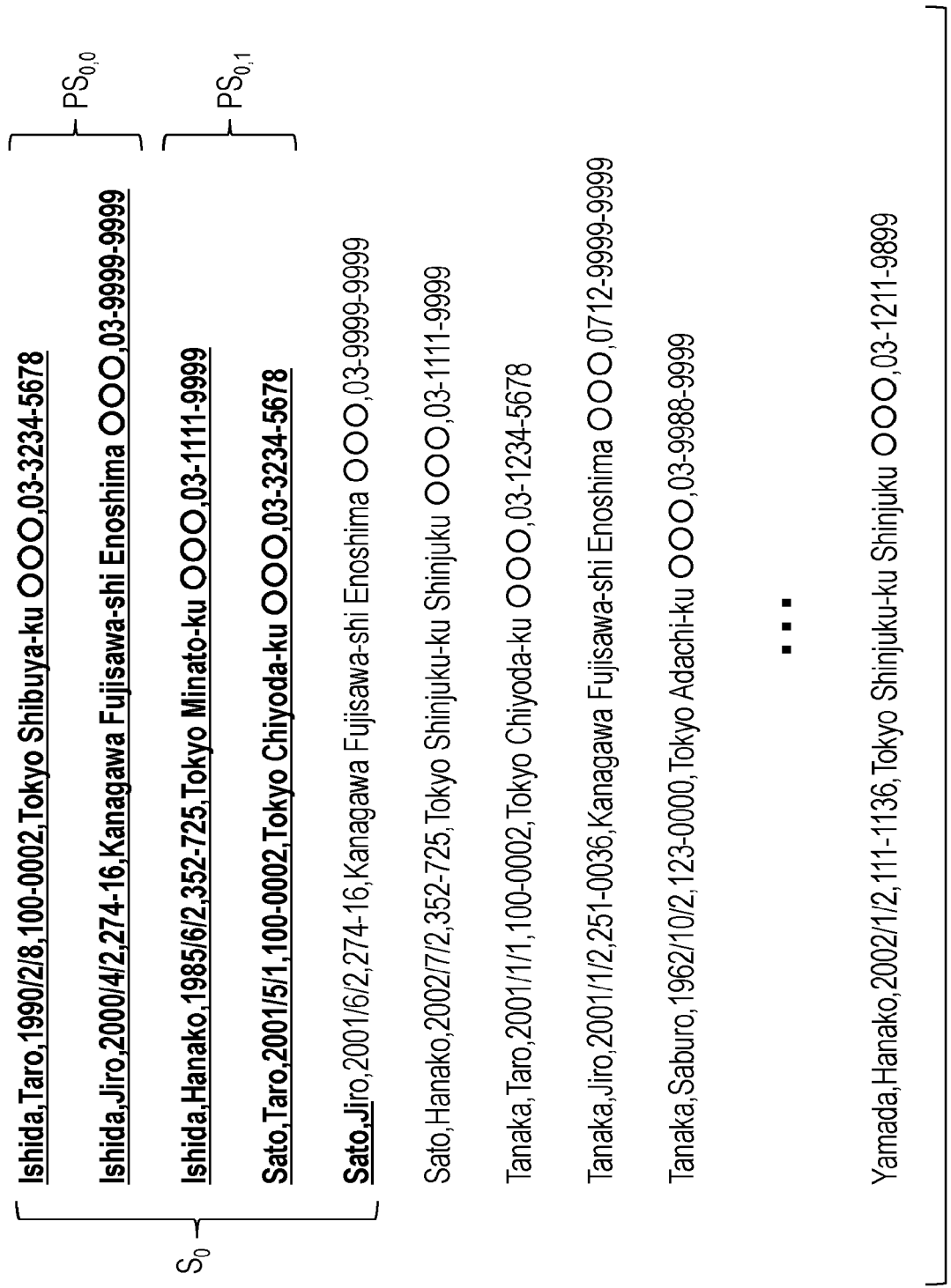
FIG. 17 is a conceptual diagram for illustrating a text file according to the embodiment.

On the other hand, when both of the file read-in lock and the parallelism lock of the thread i are released, the read-in unit 1261-$q$ reads in the file buffer size f from the main memory 123 and secures a region of the file buffer size f in the main memory 123. Further, the read-in unit 1261-$q$ reads in the character string $S_i$ which can be stored in the region of the file buffer size f from character strings of a text file stored in the auxiliary storage 122. In the example of FIG. 17, the followings are read in as the character string $S_0$.

Ishida, Taro,1990/2/8,100-0002,Tokyo Shibuya-ku ○○○,03-3234-5678

Ishida, Jiro,2000/4/2,274-16,Kanagawa Fujisawa-shi Enoshima ○○○,03-9999-9999

Ishida,Hanako,1985/6/2,352-725,Tokyo Minato-ku ○○○,03-1111-9999

Sato,Taro,2001/5/1,100-0002,Tokyo Chiyoda-ku ○○○, 03-3234-5678 Sato,Ji

In the example of FIG. 18, the followings are read in as the character string $S_1$.

ro,2001/6/2,274-16,Kanagawa Fujisawa-shi Enoshima ○○○,03-9999-9999

Sato,Hanako,2002/7/2,352-725,Tokyo Shinjuku-ku Shinjuku ○○○,03-1111-9999

Tanaka,Taro,2001/1/1,100-0002,Tokyo Chiyoda-ku ◯◯◯,03-1234-5678
Tanaka,Jiro,2001/1/2,251-0036,Kanagawa Fujisawa-shi Enoshima ◯◯◯

The read-in unit 1261-$q$ stores the character string $S_i$ in the region of the file buffer size f secured in the main memory 123 (step S1261b-$q$ in FIG. 13, $R_i$ in FIG. 14).

After the character string $S_i$ is stored in the main memory 123, the file read-in lock releasing unit 1267-$q$ releases the file read-in lock of the thread i+1 (step S1267-$q$ in FIG. 13, $UR_{i+1}$ in FIG. 14).

The parsing unit 2262-$q$ parses the character string $S_i$ read from the main memory 123 and calculates reference information indicating positions and lengths of respective cells included in the character string $S_i$ so as to store the reference information in the main memory 123. For example, in the case of the character string $S_0$ illustrated in FIG. 17, the parsing unit 2262-$q$ parses the character string $S_0$, specifies cells: 'Ishida', 'Taro', '1990/2/8', '100-0002', 'Tokyo Shibuya-ku ◯◯◯', '03-3234-5678', 'Ishida', 'Jiro', '2000/4/2', '274-16', 'Kanagawa Fujisawa-shi Enoshima ◯◯◯', '03-9999-9999', 'Ishida', 'Hanako', '1985/6/2', '352-725', 'Tokyo Minato-ku ◯◯◯', '03-1111-9999', 'Sato', 'Taro', '2001/5/1', '100-0002', 'Tokyo Chiyoda-ku ◯◯◯', '03-3234-5678', and 'Sato', and calculates reference information of these cells. Since the termination of 'Ji' on the last is not a termination of cells, reference information of 'Ji' is not calculated in the thread 0. For example, in the case of the character string $S_1$ illustrated in FIG. 18, the parsing unit 2262-$q$ parses the character string $S_1$ to specify cells: '2001/6/2', '274-16', 'Kanagawa Fujisawa-shi Enoshima ◯◯◯', '03-9999-9999', 'Sato', 'Hanako', '2002/7/2', '352-725', 'Tokyo Shinjuku-ku Shinjuku ◯◯◯', '03-1111-9999', 'Tanaka', 'Taro', '2001/1/1', '100-0002', 'Tokyo Chiyoda-ku ◯◯◯', '03-1234-5678', 'Tanaka', 'Jiro', '2001/1/2', '251-0036', and 'Kanagawa Fujisawa-shi Enoshima ◯◯◯', and calculates reference information of these cells. Since the start end of 'ro' on the beginning is not a start end of cells, reference information of 'ro' is not calculated in the thread 1. Note that, when there is not enough region for storing reference information in the main memory 123, the parsing unit 2262-$q$ reads r from the main memory 123 and collectively secures a buffer region for storing reference information for r records in the main memory 123. The parsing unit 2262-$q$ is capable of starting this processing before the buffer boundary lock of the thread i is released. That is, when i≥1, the parsing unit 2262-$q$ can start calculation of reference information of each cell included in the character string $S_i$ before calculation of reference information of each cell included in the character string $S_{i-1}$ is finished (step S2262-$q$ in FIG. 13, $P_i$ in FIG. 14).

After that, the cell specifying unit 2264-$q$ determines whether or not the buffer boundary lock of the thread i is released. The buffer boundary lock of the thread 0 is released in the initial state (step S2264a-$q$). When the buffer boundary lock of the thread i is not released, the determination in step S2264a-$q$ is repeated.

On the other hand, when the buffer boundary lock of the thread i is released and i≥1, the cell specifying unit 2264-$q$ obtains information $A_i$ corresponding to a position of a cell coining immediately after the last cell included in the character string $S_{i-1}$ by using the reference information and the character string $S_{i-1}$ and the character string $S_i$ and stores the information $A_i$ in the main memory. Meanwhile, when the buffer boundary lock of the thread i is released and i=0, the cell specifying unit 2264-$q$ does nothing (step S2264b-$q$).

After that, the buffer boundary lock releasing unit 1268-$q$ releases the buffer boundary lock of the thread i+1. Here, there are no threads corresponding to i+1>T and a buffer boundary lock of non-existent thread is not released (step S1268-$q$ in FIG. 13, $U_{i+1}$ in FIG. 14).

Then, the encoding unit 1265-$q$ and the calculation unit 1266-$q$ of the processing unit 226-$q$, instead of the processing unit 126-$q$, execute the processing of steps S1263-$q$, S1265-$q$, and S1269-$q$ which are described in the first embodiment (steps S1263-$q$, S1265-$q$, and S1269-$q$ of FIG. 13, $E_i$, $SS_i$, and $UP_{i+np}$ in FIG. 14).

Other Modifications Etc.

Note that the present invention is not limited to the above-described embodiments. For example, the parameter setting apparatus sets the number r of records, the number $n_p$ of parallels, and the file buffer size f which are handled in one unit process in the first embodiment and the second embodiment, but the embodiment in which the parameter setting apparatus does not set the file buffer size f may be employed. Further, though the comma-separated values (CSV) file is exemplified as a text file in the first embodiment and the second embodiment, processing may be performed to other text files which are described above. Furthermore, the example in which secret sharing is performed as 'calculation' is described in the first embodiment and the second embodiment, but other calculation may be performed as 'calculation'.

The above-described various kinds of processing may be executed, in addition to being executed in chronological order in accordance with the descriptions, in parallel or individually depending on the processing power of an apparatus that executes the processing or when necessary. In addition, it goes without saying that changes may be made as appropriate without departing from the spirit of the present invention.

The above-described each apparatus is embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements functional configuration by loading of programs like a CPU. An electronic circuit constituting a single apparatus may include multiple CPUs.

When the above-described configurations are implemented by a computer, the processing details of the functions supposed to be provided in each apparatus are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

Instead of executing a predetermined program on the computer to implement the processing functions of the present apparatuses, at least some of the processing functions may be implemented by hardware.

DESCRIPTION OF REFERENCE NUMERALS 1, 2 computation system
11 parameter setting apparatus
12, 22 computation apparatus
13-1 to 13-N server apparatus

What is claimed is:

1. A parameter setting apparatus for a calculation process to character strings of a text file, in which
the text file includes W pieces of records, each of the records includes G pieces of cells having an arbitrary length, each of the cells includes arbitrary pieces of characters, W and G are an integer which is 1 or greater, and the G pieces of cells correspond to attribute information, and
C is a cache memory size and M is a main memory size, the parameter setting apparatus comprising processing circuitry configured to implement:
a maximum size setting unit that sets a maximum value $S_{csv}$ of a size of character strings for one record of the text file by using the attribute information as an input;
a minimum size setting unit that sets a minimum value $s_{csv}$ of the size of character strings for one record by using the attribute information as an input;
an encoding size setting unit that sets a maximum value $S_{enc}$ of a total size of encode information obtained by encoding the character strings for one record into an element of a predetermined finite set;
a calculation size setting unit that sets a maximum value $S_{ss}$ of a total size of a calculation value obtained by performing specific calculation to the encode information for one record;
a reference size setting unit that sets a total size $S_{ref}$ of reference information indicating a position and a length of each of the cells for one record;
a process unit calculation unit that obtains and outputs a number r of records, the number r being a function value of $C/(S_{csv}+S_{enc}+S_{ref})$, where the encoding and the calculation are a process being executed for every process unit character string, the process unit character string being a character string for r records of the text file; and
a parallel number calculation unit that obtains and outputs a number $n_p$ of parallels in the calculation process, the number $n_p$ being a function value of $f_0/I \cdot r \cdot S_{csv}$, where I is a maximum value of the number of repetition times of the encoding and the calculation, the encoding and the calculation being executed for every process unit character string, $\max(S_{ref}, S_{ss})=S_{ref}$ holds when $S_{ref} \geq S_{ss}$, $\max(S_{ref}, S_{ss})=S_{ss}$ holds when $S_{ref}<S_{ss}$, and $f_0$ is a function value of $s_{csv} \cdot M/(s_{csv}+S_{enc}+\max(S_{ref}, S_{ss}))$, wherein
the number r and the number $n_p$ are parameters for the calculation process to character strings of the text tile.

2. The parameter setting apparatus according to claim 1, further comprising:
a buffer size calculation unit that obtains a file buffer size f of data which is collectively read from character strings of the text file in the calculation process, the file buffer size f being a function value of $f_0/n_p$.

3. The parameter setting apparatus according to claim 1 or 2, wherein the maximum value I of the number of repetition times is defined so that a ratio of a total processing amount of preprocessing to a total processing amount for performing the encoding and the calculation of the process unit character string is equal to or smaller than a predetermined value.

4. A computation apparatus that performs a calculation process to character strings of a text file, in which
the text file includes W pieces of records, each of the records includes G pieces of cells having an arbitrary length, each of the cells includes arbitrary pieces of characters, W and G are an integer which is 1 or greater, f is a file buffer size which is defined, $n_p$ is the number of parallels, r is a positive integer indicating the number of records, i denotes each thread, $i \in \{0, \ldots, T-1\}$ holds, T is a positive integer indicating the number of threads corresponding to a size of character strings of the text file, $1 \leq n_p \leq T$ holds, and a file read-in lock and a buffer boundary lock of a thread 0 and a parallelism lock of threads $0, \ldots, n_p-1$ are released in an initial state,
the computation apparatus comprising processing circuitry configured to implement:
a main memory;
a cache memory; and
a plurality of processing units, wherein
a processing unit for performing processing for a thread i among the plurality of processing units includes
a read-in unit that reads a character string $S_i$, the character string $S_i$ being able to be stored in a region of the file buffer size f, from character strings of the text file and stores the character string $S_i$ in the main memory after a file read-in lock and a parallelism lock of the thread i are released, a file read-in lock releasing unit that releases a file read-in lock of a thread i+1 after the character string $S_i$ is stored in the main memory, a parsing unit that calculates reference information indicating a position and a length of each cell included in the character string $S_i$ and stores the reference information in the main memory after a buffer boundary lock of the thread i is released, a buffer boundary lock releasing unit that releases a buffer boundary lock of the thread i+1 after the reference information indicating a position and a length of each cell included in the character string $S_i$ is calculated, an encoding unit that performs processing, in which a process unit character string $PS_{i,j}$ which is a character string for r records, the character strings being processing targets and being included in a concatenated character string $CS_i$, is selected based on information specified based on the reference information and the process unit character string $PS_{i,j}$ is encoded into encode information $E_{i,j}$ which is an element of a predetermined finite set, by using the cache memory, where a concatenated character string $CS_0$ when i=0 is $S_0$, the concatenated character string $CS_i$ when i≥1 is obtained by concatenating the character string $S_i$ immediately after a concatenated character string $CS_{i-1}$, J is a positive integer, and j=0, . . . , J−1 holds, a calculation unit that performs processing, in which specific calculation is performed to the encode information $E_{i,j}$ to obtain a calculation value $SS_{i,j}$ and the calculation value $SS_{i,j}$ is stored in the main memory, by using the cache memory, and a parallelism lock releasing unit that releases a parallelism lock of a thread $i+n_p$ after the calculation value $SS_{i,j}$ is obtained.

5. A computation apparatus that performs a calculation process to character strings of a text file, in which the text file includes W pieces of records, each of the records includes G pieces of cells having an arbitrary length, each of the cells includes arbitrary pieces of characters, W and G are an integer which is 1 or greater, f is a file buffer size which is defined, $n_p$ is the number of parallels, r is a positive integer indicating the number of records, i denotes each thread, i∈{0, . . . , T−1} holds, T is a positive integer indicating the number of threads corresponding to the size of character strings of the text file, $1 \leq n_p \leq T$ holds, and a file read-in lock of a thread 0 and a parallelism lock of threads 0, . . . , $n_p-1$ are released in an initial state, the computation apparatus comprising processing circuitry configured to implement:

a main memory;

a cache memory; and a plurality of processing units, wherein a processing unit for performing processing for a thread i among the plurality of processing units includes a read-in unit that reads a character string $S_1$, the character string $S_i$ being able to be stored in a region of the file buffer size f, from character strings of the text file and stores the character string $S_i$ in the main memory after a file read-in lock and a parallelism lock of the thread i are released, a file read-in lock releasing unit that releases a file read-in lock of a thread i+1 after the character string $S_i$ is stored in the main memory, a parsing unit that calculates reference information indicating a position and a length of each cell included in the character string $S_i$ and stores the reference information in the main memory, a cell specifying unit that obtains information $A_i$ corresponding to a position of a cell coming immediately after a last cell included in a character string $S_{i-1}$ by using the reference information, the character string $S_{i-1}$, and the character string $S_i$, after a buffer boundary lock of the thread i is released, where the character string $S_i$ is a character string coming immediately after the character string $S_{i-1}$ when i≥1, a buffer boundary lock releasing unit that releases a buffer boundary lock of the thread i+1 after the information $A_i$ is obtained, an encoding unit that performs processing, in which a process unit character string $PS_{i,j}$ which is a character string for r records, the character strings being processing targets and being included in a concatenated character string $CS_i$, is selected based on information specified based on the reference information and the information $A_i$ and the process unit character string $PS_{i,j}$ is encoded into encode information $E_{i,j}$ which is an element of a predetermined finite set, by using the cache memory, where a concatenated character string $CS_0$ when i=0 is $S_0$, the concatenated character string $CS_i$ when i≥1 is obtained by concatenating the character string $S_i$ immediately after a concatenated character string $CS_{i-1}$, J is a positive integer, and j=0, . . . , J−1 holds, a calculation unit that performs processing, in which specific calculation is performed to the encode information $E_{i,j}$ to obtain a calculation value $SS_{i,j}$ and the calculation value $SS_{i,j}$ is stored in the main memory, by using the cache memory, and a parallelism lock releasing unit that releases a parallelism lock of a thread $i+n_p$ after the calculation value $SS_{i,j}$ is obtained.

6. The computation apparatus according to claim 5, wherein the cell only includes a character which enables determining whether or not the character independently indicates a target of the calculation, and when i≥1, the parsing unit starts calculation of the reference information indicating a position and a length of each cell included in the character string $S_i$ before calculation of reference information indicating a position and a length of each cell included in the character string is finished.

7. The computation apparatus according to any one of claims 4 to 6, wherein

C is a cache memory size of the cache memory and M is a main memory size of the main memory, $S_{csv}$ is a maximum value of a size of character strings for one record of the text file, $s_{csv}$ is a minimum value of the size of the character strings for one record, $S_{enc}$ is a maximum value of a total size of encode information, the encode information being obtained by encoding the character strings for one record into an element of the predetermined finite set, $S_{ss}$ is a maximum value of a total size of a calculation value, the calculation value being obtained by performing the calculation to the encode information for one record, $S_{ref}$ is a total size of reference information indicating a position and a length of each of the cells for one record, the number r of records is a function value of $C/(S_{csv}+S_{enc}+S_{ref})$, I is a maximum value of the number of repetition times of the encoding and the calculation, the encoding and the calculation being executed for every process unit character string $PS_{i,j}$, $\max(S_{ref}, S_{ss}) = S_{ref}$ holds when $S_{ref} \geq S_{ss}$, $\max(S_{ref}, S_{ss}) = S_{ss}$ holds when $S_{ref} < S_{ss}$, $f_0$ is a function value of $s_{csv} \cdot M/(s_{csv} + S_{enc} + \max(S_{ref}, S_{ss}))$, and the number $n_p$ of parallels is a function value of $f_0/I \cdot r \cdot S_{csv}$, and the file buffer size f is a function value of $f_0/n_p$.

8. The computation apparatus according to any one of claims 4 to 6, wherein when there is not enough region to store the reference information in the main memory, the parsing unit collectively secures a buffer region for storing the reference information for r records in the main memory.

9. A method for executing processing of each unit of the apparatus according to any one of claims 1, 2, or 4 to 6.

10. A non-transitory computer-readable recording medium storing a computer readable recording medium that stores a program for making a computer function as the apparatus according to any one of claims 1, 2, or 4 to 6.

* * * * *